United States Patent [19]
Johnson et al.

[11] Patent Number: 5,758,190
[45] Date of Patent: May 26, 1998

[54] CONTROL UNIT THRESHOLD TIMEOUT CONTROLS FOR SOFTWARE MISSING INTERRUPT HANDLERS IN OPERATING SYSTEMS

[75] Inventors: Gavin Stuart Johnson, Aromas, Calif.; Richard Anthony Ripberger, Tucson, Ariz.; Luis Ricardo Urbanejo, Morgan Hill, Calif.; Harry Morris Yudenfriend, Poughkeepsie, N.Y.

[73] Assignee: International Business Machines Corporation, Armonk, N.Y.

[21] Appl. No.: 629,702

[22] Filed: Apr. 9, 1996

[51] Int. Cl.$^6$ .................................................. G06F 13/24
[52] U.S. Cl. ............................................. 395/868; 395/733
[58] Field of Search .............................. 395/868, 856, 395/838, 839, 726, 728, 733, 739, 735, 869

[56] References Cited

U.S. PATENT DOCUMENTS

| | | |
|---|---|---|
| 4,371,932 | 2/1983 | Dinwiddie, Jr. et al. . |
| 4,771,403 | 9/1988 | Maskovyak et al. . |
| 4,974,147 | 11/1990 | Hanrahan et al. . |
| 5,003,462 | 3/1991 | Blaner et al. . |
| 5,257,368 | 10/1993 | Benson et al. . |
| 5,257,379 | 10/1993 | Cwiakala et al. . |
| 5,307,482 | 4/1994 | Bealkowski . |
| 5,333,274 | 7/1994 | Amini et al. . |
| 5,388,254 | 2/1995 | Betz et al. . |

Primary Examiner—Glenn A. Auve
Attorney, Agent, or Firm—Bernard M. Goldman

[57] ABSTRACT

I/O control unit (CU) features for supporting multiple host operating systems (OSs) which use missing interrupt handler (MIH) timeout functions for detecting potential failures of requested I/O device operations. These CU features support multiple host OSs by preventing them from falsely indicating I/O device failures, when in fact the device has not failed but is merely processing one or more other requests for other host Oss.

17 Claims, 14 Drawing Sheets

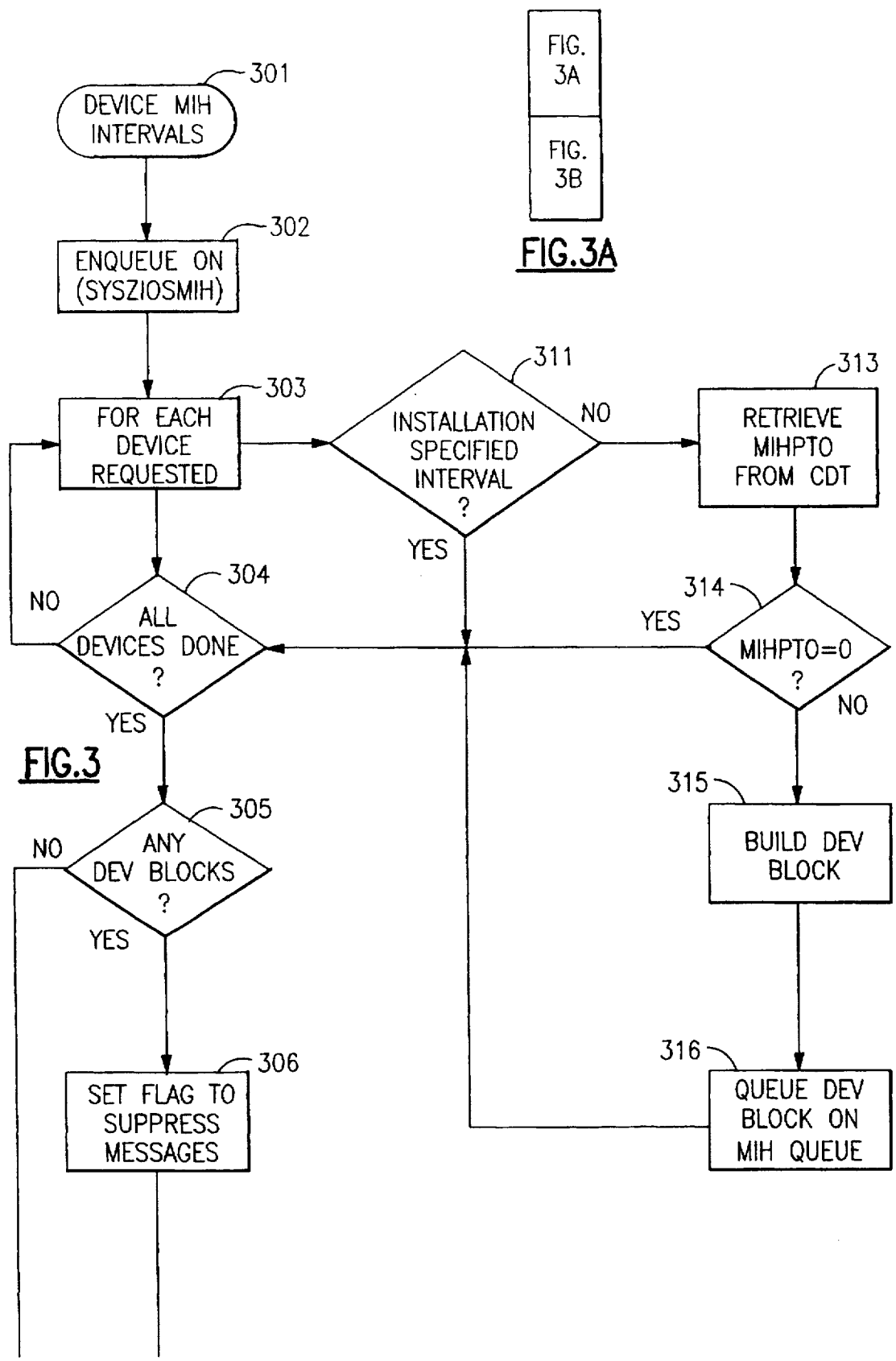

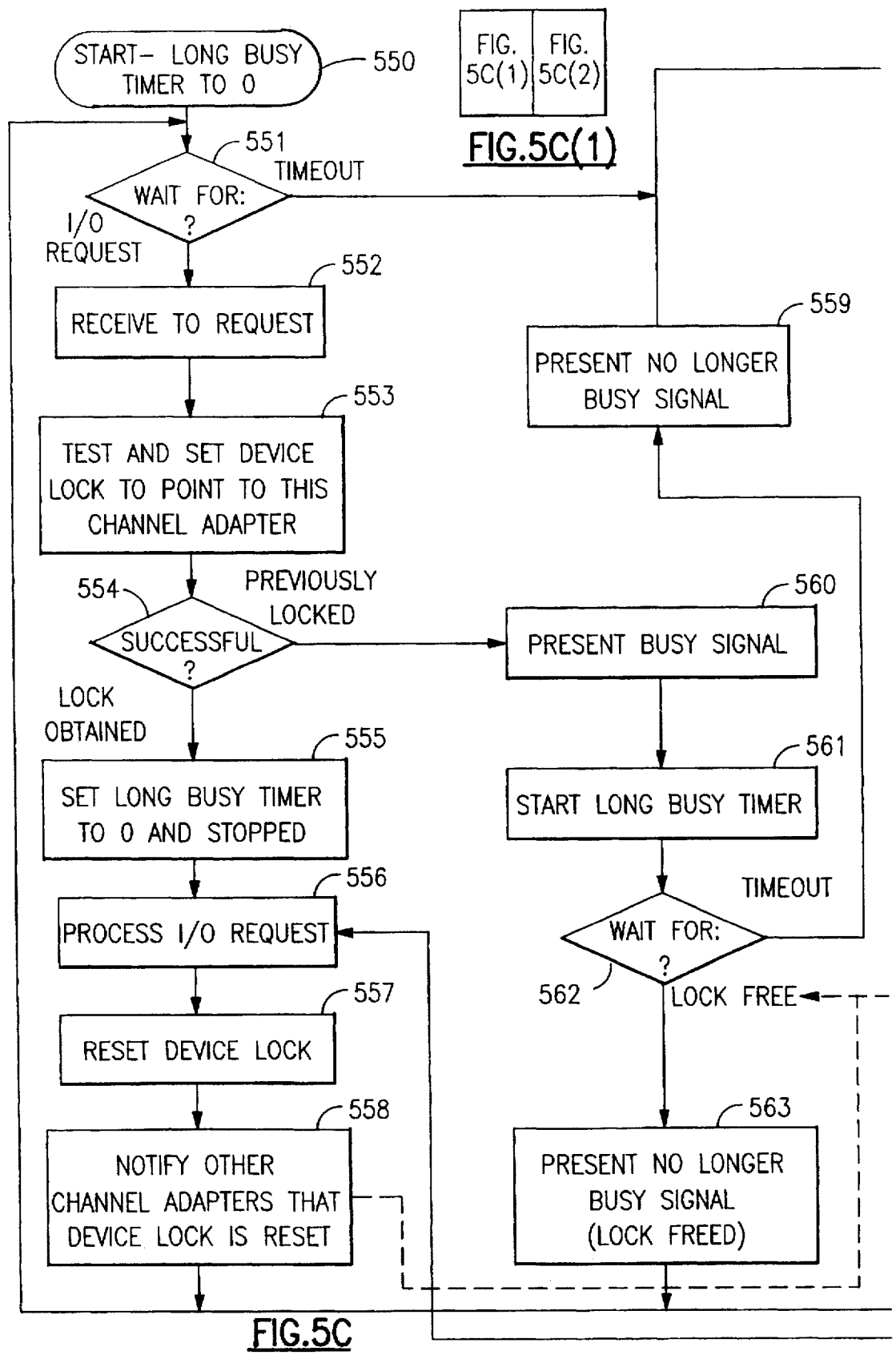

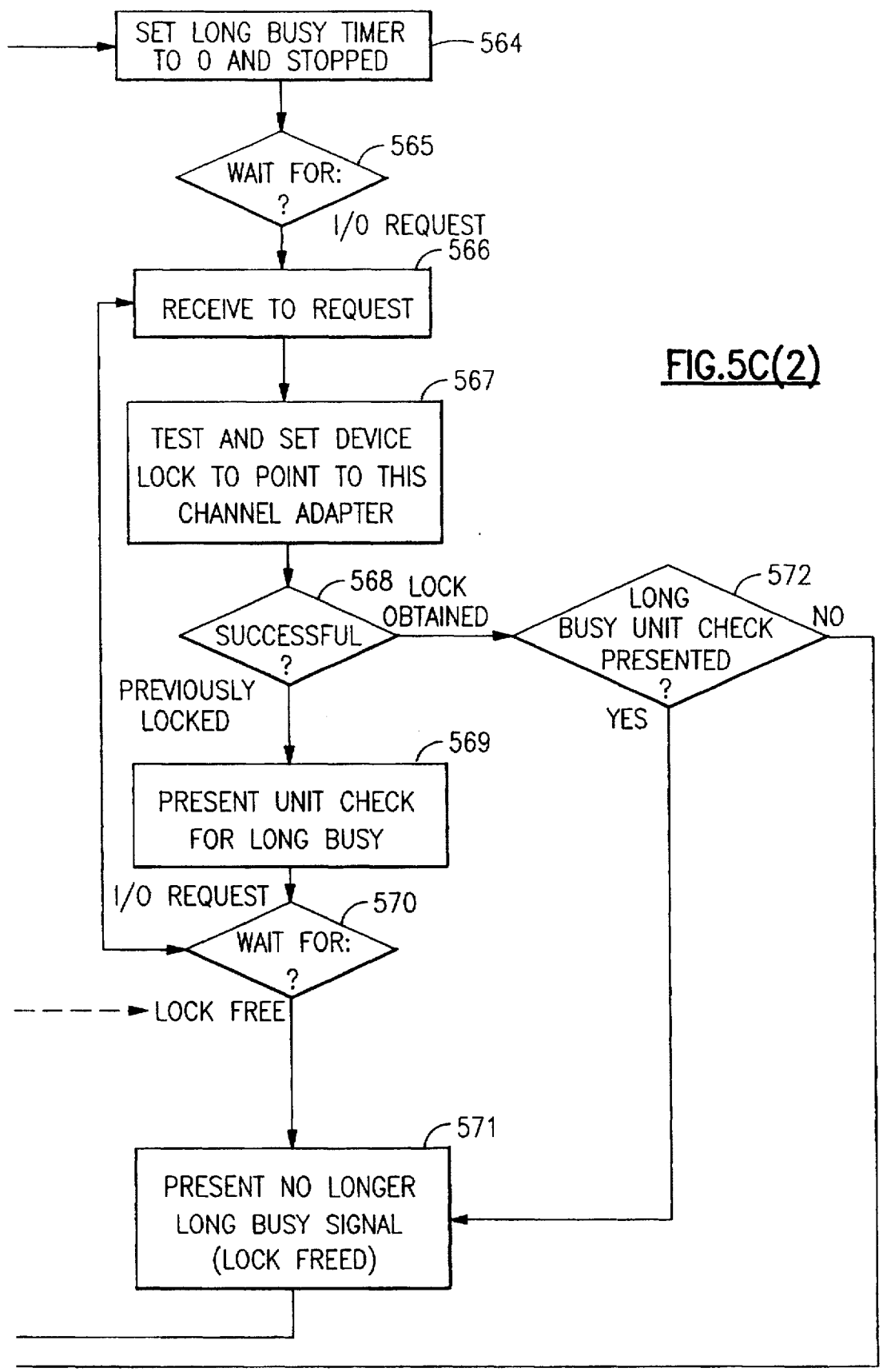
FIG.5C(2)

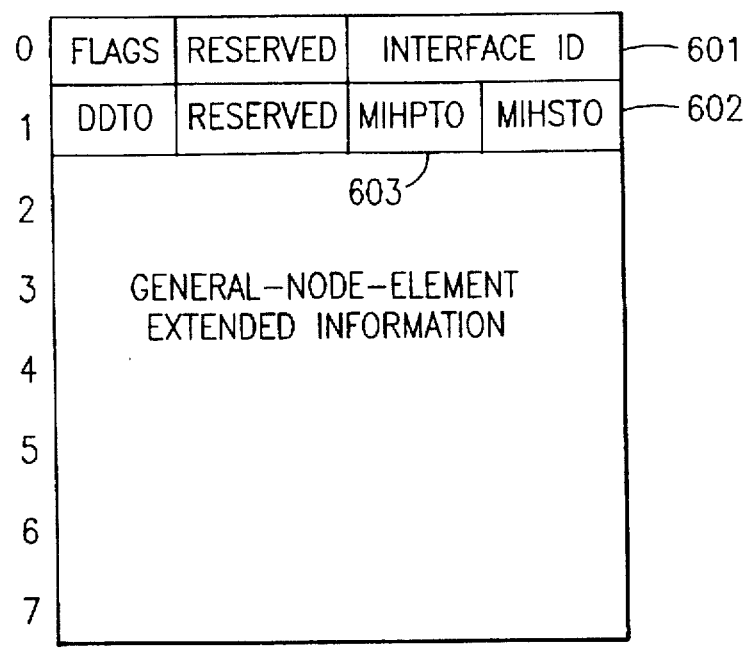
FIG.6A
FIG.6B
| EXPONENT VALUE | VALUE |
|---|---|
| 00 | INCREMENTS OF 1s OF SECONDS |
| 01 | INCREMENTS OF 10s OF SECONDS |
| 10 | INCREMENTS OF 100s OF SECONDS |
| 11 | INCREMENTS OF 1000s OF SECONDS |
FIG.6C

CONTROL UNIT THRESHOLD TIMEOUT CONTROLS FOR SOFTWARE MISSING INTERRUPT HANDLERS IN OPERATING SYSTEMS

FIELD OF THE INVENTION

This invention is related to I/O control unit (CU) features for supporting missing interrupt handler (MIH) timeout functions for detecting potential failure of I/O device operations requested by any of multiple operating systems (OSs) in a computer arrangement. This invention prevents certain types of erroneous indications which may be caused when a waiting I/O request is unduly delayed by a current I/O request using the same device. The MIH detects potential I/O device operation failure by a timeout of an MIH timeout period which starts when a request is issued by the OS. If no operation-completion interrupt is received from an I/O device before the MIH period times out for the operation, a potential I/O device-failure indication is generated in the OS.

INCORPORATED APPLICATIONS

The subject specification is related to specification having Ser. No. 08/629,661 and specification having Ser. No. 08/631,689, both filed on Apr. 9, 1996. The entire specifications of application Ser. Nos. 08/629,661 and 08/631,689 are incorporated by reference into the subject application which was filed on the same day as application Ser 08/629,661 and 08/631,689.

BACKGROUND OF THE INVENTION

In all computing environments, interrupts from various I/O devices may go unrecognized by an OS which requested an operation by the device, either because: the I/O device failed to present the interrupt due to a component in the path from the device to the OS failing to properly transfer the interrupt, or the OS failing to recognize the interrupt when presented.

Failure to detect a missing interrupt may cause operations in a data processing system to slow down and ultimately cease when a critical resource cannot be released until the interrupt occurs or the processing associated with the missing interrupt is terminated. Such detection failure may require an unscheduled system restart (IPL) to make the resource available again. Manual attempts to locate the request for the resource on some queue usually take longer than the requesting customer can afford to wait.

To reduce the catastrophic impact of a missing interrupt to the system, a method was developed to detect lost interrupts and allow failed operations to be terminated, recovery mechanisms deployed, and failed operations restarted or to terminate the job that initiated the operation with an error. This mechanism is called the Missing Interrupt Handler (MIH) and has the ability to 'time' I/O operations that are in progress. Actually, this is not a time measurement but rather a limit on the length of time that is considered 'normal' for the longest possible I/O operation to the device. This does not mean that all operations should take a long time but rather, all operations that exceed this time are to be considered abnormal. The Missing Interrupt Handler is therefore a 'safety net' under the system to shield the host from the effects of a lost interrupt.

Initially, only a couple of timer values were established to differentiate between slower devices (unit record) and faster devices (DASD) which allowed only limited ability to tailor timer values for different machines. Two timer values were not adequate and additional individual MIH timer values have been implemented which can be adjusted to meet the needs and response requirements of various devices.

Over time, the capabilities of the MIH component have been expanded to allow dynamic modification of the MIH timeouts, including the ability to place time limits across all I/O request processing including queuing time and error recovery procedure (ERP), instead of just active time as originally implemented. However, today's Missing Interrupt Handler components of computer operating systems have deficiencies.

In today's operating systems there are various default MIH intervals based on device class (i.e. DASD, TAPE, etc. ...). However, within each device class there is a great disparity between the recommended MIH times for different device types. For example, on tape devices the recommended MIH detection interval for the different model tape devices varies from 3 minutes for S/390 3420 tape device to 20 minutes for a S/390 3490E tape device. This variation in MIH time is due to the varying amounts of capacity a tape can contain and the maximum physical speed that the medium can be moved.

The MIH detection interval must be greater than the time to execute the longest command at the device (e.g. forward space file, rewind/unload, etc. ...). Another example is for DASD devices. The MVS (Multiple Virtual Storage, IBM's premier operating system for S/390 machines) operating system has a 15 second default MIH time for DASD devices. This usually only needs adjustment by a system operator due to special characteristics of the work load or applications using a particular device. For example, a JES2 (job entry system 2) checkpoint data set may get reserved for long periods of time during initialization, but high availability applications need to be notified after only a few seconds if their I/O has not completed in order for the application to attempt an alternate device and still make transaction time requirements. However, new DASD characteristics further complicate the issue of choosing an MIH detection interval. The IBM 3990 DASD has internal error recovery functions that can take 30 seconds to complete. If an MIH condition is detected during this recovery, the host recovery actions can cause severe problems at the control unit. Thus, it is recommended for the 3990 DASD that system operators set a 30 second MIH interval. Additionally, other devices may be defined to the system as if they are DASD devices. An example of this may be the IBM 3995 optical devices; some operations on these devices require the mechanical removal and mounting of optical media, which can take several minutes. Complicating matters further, any time new devices are added to a computer system, the existing MIH customization information may need to be updated to insure proper operation of such devices.

An additional problem with operating system MIH handlers is that the MIH times are too long. As discussed above, MIH times need to be set by the customer for each device type based on the characteristics of that device. If the longest commands that can be executed are expected to take 20 minutes (i.e. a rewind/unload) then all hang conditions are detected after the 20 minute interval, even though most simple data transfer commands can be expected to execute in seconds. Elongated error detection times impact the customer, in that they degrade system reliability and availability. If a new device with improved technology is substituted for the old device the MIH time must be manually adjusted to meet the new requirements.

Additionally, with today's devices and MIH capability, all commands are timed at the same MIH interval. This applies also to special control and recovery commands that are used by the operating system during recovery and reconfiguration actions (i.e. set path-group-ID, sense pathgroup-ID, reset allegiance, assign/unassign, control access, etc. . . . ). When these commands are issued by the operating system, critical system resources may be held which may delay the execution of other normal customer work. The addition of special timer code for the recovery of these commands is extremely costly to the development of the system and increases the cost of the product.

As described above, computer systems require the customer to manually set the MIH times based on the physical characteristics of the device. For example, the customer is responsible for knowing that S/390 3995 Optical Library device is really defined as an S/390 DASD 3380 device and that the MIH intervals must be set high enough so that MIH conditions are not detected for normal staging/destaging of the optical media. Additionally, if a set of tape drives are added or upgraded, the MIH times need to be adjusted based on the speeds and capacities of the tape drives. This manual process is error prone. If accidentally omitted false MIH conditions are detected, jobs may fail.

Also, MIH specifications need to be synchronized with physical I/O configuration definitions, and updated across system configuration changes done both dynamically as well as by system restart. If the MIH times are not updated correctly, system RAS will be degraded. The fact that customers have to be aware of the MIH detection for different devices adds to the cost of systems management and the overall cost of computing.

System Environment: FIG. 5a shows a multiplicity of hosts (510). Each host is a general purpose computer system containing one or more central processing units (CPU (511)), responsible for executing programs consisting of central processor instructions, and an I/O channel subsystem (512) responsible for executing channel programs and managing the transfer of information over one or more channel paths (513) between the host (510) and one or more I/O subsystems (520). In the preferred embodiment, host computers are IBM S/370 or IBM S/390 computer systems attached to I/O devices via ESCON or OEMI I/O channel interfaces. However, the computers may be of any type and may in fact be a multiplicity of types. Similarly, the channel paths may be a multiplicity of types, provided the interface is supported by the attaching host and I/O subsystem. The topology of the channel paths is potentially unique to the type of I/O interface.

Each I/O subsystem (520) consists of a control unit (521) responsible for managing one or more devices (530) connected to one or more hosts (510). I/O devices are attached to the control units via one or more device paths (531) that are supported by the devices and the control units for the communication of information. In general, the control unit adapts the I/O interface supported by the device (i.e. device paths (531)) to the I/O interface supported by the host (i.e. channel paths (513)).

Internal to each control unit (521) are facilities which are used to manage the interaction between the multiplicity of hosts and the multiplicity of devices. Each channel path is attached to a channel adapter (524) within the control unit which contains the facilities required to communicate on the associated channel path. A shared memory (522) is present in each I/O subsystem (520) that is accessible by I/O processing elements within the I/O subsystem that control the channel adapters (524). This shared memory contains a block of information associated with each device which is referred to as "device n lock data" (523).

Within each host (510), an OS program is executed by any of its CPUs (511) which performs the operations to cause the channel subsystem (512) to issue I/O signals to a selected device (530) attached to a selected channel path or set of channel paths (513). The OS program is designed such that it monitors the duration of the I/O operation from the time the request is presented to the channel subsystem (512) until a response is received from the channel subsystem (512) indicating that the I/O operation has completed. If the elapsed time of an I/O operation exceeds some threshold, the program detects a missing-interrupt timeout as described in prior U.S. Pat. No. 5,388,254 assigned to the same assignee. This MIH program function is intended to detect I/O operations that have failed to complete due to some unreported condition, thereby avoiding an indefinite suspension of processes that depend on the completion of the I/O operation.

Within the channel subsystem, an I/O request can be queued for a selected device. The I/O request causes a communication to be initiated over a channel path between the channel subsystem and a selected control unit as a result of queuing the I/O request while waiting for a requested device to perform the request. While an I/O request is being processed by the channel subsystem, the OS program is allowed to continue execution of other work. At the completion of the I/O operation, the channel subsystem interrupts the OS program to present the status of the completed I/O operation.

The control unit manages concurrent requests to each device it controls. If the control unit decides to allow an I/O request made by a host, the command is accepted from the channel and is processed for the device selected by the channel. If the control unit decides to not allow an I/O request made by a host because of concurrent activity, the command is rejected with a "busy" indication causing the I/O request to be queued in the channel subsystem. When the control unit determines that it can perform the command after having previously presented it with a busy indication, the control unit presents a "no-longer busy" indication to cause the channel subsystem to reissue the queued I/O request. The requesting OS program is not aware of this interaction except to the extent that its I/O request has not been signalled as having been completed. The algorithm normally used by a control unit to present a busy indication is discussed subsequently. This invention describes enhancements which increase system efficiency by allowing a reduction in the time limit used by the OS program to reliably detect for missing interrupt signals when one or more OSs are making concurrent I/O requests to the same control unit.

Management of Concurrent I/O Requests: The control unit determines the number of concurrent I/O requests that can be in progress at the control unit for a given device. Often, devices have a requirement that I/O requests be serialized to ensure predictable results on a medium handled by the device. Other design constraints within the control unit may also place limits on the number of requests allowed to concurrently be performed for a device.

FIG. 5b shows a process that can be employed to limit to one the number of concurrent I/O requests accepted, which causes a serialized execution of concurrent requests at the device. This policy is enforced by a device lock protocol used by the channel adapters, in which the adaptor performs an atomic "test and set operation" on a lock associated with the requested device in a lock data block 523 for the device. This lock test and set protocol is performed before beginning any I/O operation by the device. If the test and set operation is successful (finds the device is available), the I/O operation is accepted and processed by the device. If the test and set operation is unsuccessful (the device is not available), the I/O request of a channel adapter is presented with a busy indication. A channel adapter is successful when it obtained a lock for the needed device (by setting a lock bit associated with the device). At the completion of the device operation, each channel adapter that was signaled a busy indication is then signalled a "no longer busy" indication, so that I/O requests queued in the channel subsystem can again be reissued for the device. This cross channel adapter communication is indicated by the dotted line in FIG. 5b. The implementation of the presentation of the "no longer busy" indication may require consideration of "fairness" mechanisms to prevent certain hosts from continually preventing other hosts from accessing the device. Variations of this method may be provided for different interface architectures (e.g. SCSI untagged and tagged queuing) where a serialization queue is built in the control unit instead of using a channel subsystem queuing capability.

Bounding of Queuing Durations: A problem that arises with the busy/no longer busy method previously discussed for serialized concurrent I/O requests is that the time required to execute an I/O operation from the host's perspective is NOT a function of time needed for execution of the requested I/O operation at the control unit (CU). That is, the execution time from the host OS perspective is the actual CU/device execution time plus waiting time (during which the CU is executing other intervening I/O operations for other hosts). In effect, without OS knowledge of all I/O operations in the queue for the device, it is not possible to determine the duration of a requested I/O operation for the purpose of determining an appropriate missing-interrupt-timeout value. Given some degree of fairness in the resolution of concurrent accesses and some bound on the number of concurrent requests, a statistical analysis can be performed to pick a duration which will have a high probability of ensuring that the failure to detect the completion of an I/O operation is due to some failure condition and not as a result of concurrent access requests.

For example, assume a given disk device normally executes any command in less than 10 milliseconds. If most I/O requests have no more than 10 commands (10 I/O channel instructions), and there are generally no more than 10 hosts that will get relatively equal service, then multiplying the 10 milliseconds*10 commands*10 hosts gives an expectation that an I/O request should take no longer than about 1 second. This number would then be increased by some factor to handle exceptional conditions within some high degree of probability, say to 15 seconds.

The problem is compounded when there is a wide variation in the expected execution durations of the I/O operations for a given device because the statistical analysis for predicting a resolution of concurrent requests must consider the worst case I/O operation execution times, further increasing the discrepancy between the duration of a "short" I/O request and the missing-interrupt timeout.

For example, assume that for a given disk device, a typical command normally executes in less than 100 microseconds, but an outboard copy command (copy the content of this disk to another disk) executes in less than 5 minutes. If we determine statistically that an I/O request will not be queued for longer than eight concurrent requests (i.e. this host gets a turn at least once out of every eight I/O requests processed), then we could estimate that, worst case, the queuing time is 7×5 minutes=35 minutes. If this host is executing a typical command, the missing interrupt timeout estimated as the sum of the queuing time and the command execution time would be 35 minutes and 0.0001 seconds, or alternatively, about 35 minutes. One might also consider the probability of having seven different hosts issue seven concurrent outboard copies and arrive at a conclusion that a smaller timeout limit than 35 minutes is possible, say n minutes where n<35, based on the probability of all the sharing systems initiating a full copy at the same time.

Often, the program must perform additional I/O when a missing interrupt is detected. These I/O requests may be just as likely to encounter a queuing problem and consequently must have the same missing interrupt timeout applied. For the case where the device is in fact broken and is no longer capable of responding to the host, it is easy to see where it could take tens of minutes before the program comes to the conclusion that the job has failed and must be rerun.

In certain environments, the program may not be able to wait for the duration of time prescribed by such statistical methods and still meet its requirements for real time processing. In other cases, the missing interrupt timeout and resulting recovery is of such duration as to create operational difficulties (e.g. processing does not complete within required windows).

Prior MIH detection systems have not worked well for single OS data processing systems because such MIH processes can be the source of false error indications when certain scenarios happen. For example, a false indication would occur in a scenario where a long I/O command (a command requiring a long period of I/O operation) was issued to an I/O control unit as the last command of an I/O program, and before the last I/O command is completed, another I/O program is attempted to be initiated by the OS with a short command to the same device. In the prior system, the long command would signal partial completion when the long command is accepted at the control unit. This caused the next request to the I/O device to wait until the device completed operations for the first request. (To those skilled in the prior S/390 I/O architecture, this is known as redriving on primary status, which allows prompt termination of a job and the initiation of a new job following a tape rewind/unload command). If the second I/O request were allowed to start before the first request finished, and the operating system tried to adjust the MIH timeout for the presumed active short command, a false error would be detected because of the lack of OS knowledge concerning the execution time for the previous long command. This short timeout then would falsely indicate a missing interrupt. No interrupt was actually missing because the short command was not yet started by the device due to the device still performing the prior long command (and neither of these commands could yet provide any completion interrupt).

SUMMARY OF THE INVENTION

This invention relates to I/O control unit (CU) features for supporting multiple host operating systems (OSs) which use timeout functions for detecting failure of requested I/O device operations. These CU features support host OSs by preventing them from falsely detecting I/O device failures, which is a problem when an I/O device is shared by multiple host OSs. Each I/O request from all host OSs which share use of the I/O device is expected to complete within a predetermined MIH timeout period. If the I/O device has not signalled the OS with a successful completion interrupt before the end of an MIH timeout period, the MIH generates an indication of a potential failure of the requested I/O device operation (when in fact that device may not have failed but may be merely processing requests for other host OSs, so that the MIH potential failure indication is false).

Such host OS MIH detection function is commonly done by OS MIH software which starts an MIH timeout for each issued I/O request, and indicates a failure of that I/O device if it does not receive a successful completion interrupt from the I/O within the predetermined MIH timeout.

The subject invention is embodied in an I/O CU which contains a plurality of host interface adapters that respectively receive I/O requests from different host systems having different OSs. The CU has a respective lock bit for each of its I/O devices. Concurrently received I/O requests for the same device contend for the same lock, but only one of the concurrent requests is given the lock at a time.

Each host interface adapter also has busy bit and a threshold timer. The busy bit is set when a request is received by the adapter for an unavailable device (locked), and the threshold timer is then started. The rejected request then waits for the requested device to become available before a threshold timeout occurs. A CU stored threshold timeout value determines the threshold timeout, which is set to occur before an OS MIH primary timeout can occur. Completion of the current I/O request by the device before the threshold timeout occurs triggers the waiting request to then contend for the device lock, which it may or may not then obtain.

Occurrence of the threshold timeout causes the adapter to generate a long-busy interrupt which is signalled to the OS MIH; and that interrupt causes the OS MIH to extend its initial primary MIH timeout period to a secondary (long-busy) timeout value. The latter causes a much longer timeout in the OS MIH. This long-busy timeout prevents the initial primary timeout period from timing out, which would then falsely indicate an I/O device failure.

If a host interface adapter receives another I/O request for a device which is busy (locked), that request is rejected by the device, but is allowed to wait in the I/O subsystem until any threshold timeout occurs. After any threshold timeout, the request is signalled back to the OS. That is, the adapter signals the OS to take back the waiting request by generating a long-busy interrupt which the adapter sends to the OS, and the OS then stops its MIH timer for the waiting request (to prevent the primary timeout from occurring for the waiting request) which now does its waiting in the OS instead of in the I/O subsystem. Later the OS restarts the MIH timer when it reissues the waiting request to the I/O CU.

When a current I/O request successfully completes during a long-busy period, its CU device lock is set to its available state, a device-end interrupt is signalled to the OS, which then reissues the waiting request and restarts OS MIH timer (using the primary timeout value) for that request. If the device operation does not successfully complete within either the MIH primary or secondary longbusy timeout period, the long-busy timeout will indicate a device failure.

This invention permits the MIH maximum timeout to be extended any number of times. In the preferred embodiment, the MIH timeout period is extendable once—from a minimum primary MIH timeout period to a maximum (and much longer) secondary MIH timeout period). The short primary MIH time period is chosen to enable most I/O device operations to complete before it ends.

This invention shortens the MIH timeout period (when compared to the fixed MIH timeout period used in prior systems for each I/O device of a given type) to provide faster detection of most I/O device failures than the prior MIH software. The faster determination of potential I/O device operation failure by this invention is because of the shortening of the MIH timeout period for most I/O device operations. This invention's extension of its MIH timeout period from its minimum MIH timeout period is only needed for a few I/O operations which require a long time to complete. Hence, an overall improvement in system efficiency can result from use of this invention.

Theoretically in this invention, the MIH maximum timeout period may have any finite number of extensions. For example in the preferred embodiment, the MIH maximum time period may be extended twice by using one CU threshold timeout at each of the CU's host interface adapters. Two CU threshold timeouts would be used at each of the CU's host interface adapters to support an MIH timeout period with three extensions, in which the first CU threshold would support a short primary MIH timeout period similar to the short primary MIH period in the preferred embodiment. Reaching the end of the first CU threshold triggers the MIH to invoke the second MIH extension (e.g. long-busy extension). The second CU threshold would timeout shortly before the end of the MIH second extension period to trigger the third (and last) MIH extension in the second example.

If the second extension ends a long secondary MIH timeout period, the third extension may be said to end a super-long MIH extension period. In the latter example, the third super-long MIH extension period would only be needed for exceedingly long I/O device operations, such as a tape mounting command involving human intervention which would provide a MIH timeout failure indication at the end of the third extension period. Most I/O device operations would use only the primary MIH extension, with a few longer-running I/O device operations using the secondary MIH extension. However after the first threshold interrupt, the location of the waiting request may be changed, after which it will do its waiting in the OS instead of in the I/O subsystem where it is available to immediately contend for a device lock. This is affected by the I/O architecture of the computer system.

It is apparent from the above examples that the invention may have any number of OS MIH timeout extensions, and that each OS MIH extension has a corresponding CU threshold timeout at the CU interface adapter for that OS. Each CU threshold timeout is set to timeout shortly before the corresponding MIH extension timeout. The time between any threshold timeout and its corresponding MIH timeout must allow the adapter to send an interrupt communication to the OS (associated with a waiting I/O request) to extend its MIH timeout by its next time extension before the current period's MIH timeout can occur. The MIH timeout declaring potential I/O operation failure is always the timeout at the end of the last used extension.

This invention may use a long busy state at the I/O device, or at its I/O control unit for commands which require a channel program execution time exceeding some predetermined primary MIH timeout period.

In an environment of multiple OSs sharing an I/O device, a requesting OS program is not aware of processing performed by the channel subsystem for another OS requesting a use of the same device, and consequently one OS is oblivious to any I/O request queuing (waiting) that may be occurring in the channel subsystem or within the control unit for another OS.

If we consider a device which uses commands with similar command execution times (i.e. no command which has a significantly different command execution time), an ideal situation would be to report any queuing that is going to exceed the worst case execution time of any appropriate I/O request. In this case, the MIH timeout would be set to slightly larger than the longest expected execution time of these commands from the prospectus of the OS. If the OS did not receive an indication that an I/O operation has completed or that excessive queuing is occurring, then it would assume that an interrupt has been lost. A practical MIH timeout is on the order of several times the worst case time for executing a typical command.

This invention includes a CU Long Busy Protocol for handling long executing commands of I/O requests. There are non-error conditions, such as excessive queuing durations, which can result in significantly long processing times from the prospective of the requesting OS (even though the command is not yet executing in the requested device), and this invention can be used to handle I/O commands of any duration from the OS perspective. More specifically, this invention notifies the requesting OS when excessive waiting exists for a request, so that the OS can extend its MIH timeout to an expected duration of the I/O request being issued plus a time threshold based on what the I/O subsystem reports as excessive queuing. Given that excessive queuing is infrequent, the overhead of reporting an excessive queuing condition has little overall impact on system efficiency. As such, the invention allows the OS to use a relatively short MIH timeout for normal short command processing, while still allowing longer MIH timeouts to be used for long duration command processes that may occur.

It is an object of the present invention to provide a signalling process which enables a requested I/O device to signal multiple host OSs when a long running I/O command is being performed by a device that receives another I/O request from one or more other OSs that share the requested device.

It is a further object of the present invention to provide granular MIH detection timeouts for handling most missing interrupts.

It is another object of the present invention to provide for granular MIH timeouts for use by one or more OSs sharing the same I/O device.

It is a still further object of this invention to eliminate previously required manual customization of MIH timeout values in an OS when I/O configurations are modified by adding new devices, renaming devices, moving devices, or applying a new service to existing devices.

In a preferred embodiment of this invention, each I/O command for device operations is classified into one of two classes, short and long, according to the expected execution time of the command—including any internal recovery processing time and queuing time caused by busy conditions for a command which can extend the wait (queuing) time for backed up requests to a shared I/O device. Short commands normally execute in milliseconds, such as a disk seek command. Long commands may take many seconds/ minutes to execute, such as a tape rewind command.

In the preferred embodiment, two MIH timeouts are assigned in relation to the execution of I/O requests (i.e. having channel programs): a PRIMARY MIH timeout and a SECONDARY MIH timeout. Each MIH period starts when the I/O request is issued to the channel subsystem by an OS, such as when a processor executes a "start I/O", or a "start subchannel" instruction. Each I/O request containing only short duration commands is expected to execute during an the primary MIH timeout period, and each I/O request having at least one long duration command is expected to execute during a secondary MIH timeout period. These MIH timeouts are defined for each I/O device type, and hence they may differ from one device type to the next.

The primary MIH timeout ends after completion of the longest expected execution time for most I/O requests, and this MIH timeout includes any internal recovery processing time and queuing time caused by busy conditions for any of such commands. The secondary MIH time interval ends after completion of the execution time for the I/O requests containing one or more long commands. A long command has an execution time which is longer than the primary MIH timeout but is shorter than the secondary MIH timeout.

This invention provides a new I/O signal for I/O devices; it is herein called a "long busy" signal. Whenever a device is executing a long command for an I/O request, the device is herein defined to be in a long busy state. When no long command exists for an I/O request, the device is not considered to be in the long busy state. Whenever another I/O request is presented to an I/O device in the LONG-BUSY state, the device rejects the I/O request with an interrupt having "long-busy" status information. In the preferred embodiment's S/390 I/O architecture, it is signalled by the device controller sending the processor I/O subsystem a "unit check interrupt" signal with "sense data" information.

Each I/O command (defined in any I/O computer architecture for a usable I/O device type) in an I/O program is classified by this invention as either a "short duration I/O command" which completes within the bounds of an assigned primary MIH timeout period, or as a "long duration I/O command" which completes after expiration of the primary MIH timeout period but before expiration of the secondary MIH timeout period; both of these timeout periods are started when the OS issues a start instruction for the I/O request having the command.

The preferred embodiment herein uses the S/390 architecture in which I/O commands are defined by channel command words (CCWs) interpreted by an I/O processor in an I/O subsystem of a central processor complex having one or more CPUs, and any CPU may initiate I/O requests.

Each I/O device has a "self description data block" stored in the I/O control unit to which the device is connected. Each device's self description data block is modified by this invention to include both a primary MIH value and a secondary MIH value for the commands to its associated devices. The self description data block contains two lists of commands, one list for short duration commands and a second list for long duration commands. Any device's self description data block may be optionally obtained by a CPU executing a "read configuration data" CCW, for example, to obtain the command lists or the two MIH intervals.

When an OS initializes its on-line devices (devices to which the OS can send I/O requests), validation operations are performed to determine that the devices indeed exist and are defined correctly to the OS. Part of this initialization process obtains the self description data block for each device and enables the building of a software table that represents the physical I/O configuration available to the OS. The device's self description data may optionally include a primary MIH timeout value and a secondary MIH timeout value. If the device's self description data block contains a primary MIH timeout value for which the customer did not explicitly specify an overriding MIH timeout value, a default primary MIH timeout value is assigned therein for the device. Similar configuration processing is performed for any I/O device that is varied on-line after system initialization.

In more detail, each I/O request has an associated channel program comprised of CCWs. The channel program should complete execution within the primary MIH time period (interval) if it does not contain any long commands. If the channel program contains any long command(s), it should complete within the secondary MIH timeout period (interval). After an I/O request has been active for the duration of one primary MIH timeout period, the OS invokes a device dependent MIH exit to perform a subprocess that scans the channel program to determine if the channel program contains any long running command (represented in the associated long command list for the device).

If the channel program does not contain any long executing command, the primary MIH interval is used for the I/O request. If the channel program contains at least one long executing command, the secondary MIH interval is used for the I/O request.

An MIH time measuring process is started when an I/O request is issued by the OS. This process increments a counter to measure the total time that has transpired for the I/O request since the OS made the request to its I/O subsystem. The timing process periodically compares (e.g. at a specified timer interrupt signal) its currently measured time against a chosen MIH interval value (primary or secondary MIH timeout period) to detect for expiration of the chosen MIH timeout period. Once a timeout for a period has been detected, the MIH timing process may request that the OS terminate the channel program of the I/O request, and to invoke normal recovery processes.

In the prior art, if a device is executing an I/O request containing a long running command, and a second OS issues an I/O request to the same device (waiting on an I/O queue), the second OS request can be required to wait until expiration of the primary MIH timeout period falsely indicates a potential MIH error condition due to a missing device-operation completion interrupt, when no interrupt is in fact missing because it has not yet been provided.

But with this invention, no false error condition may be detected, due to a "long-busy" signal being sent to all relevant OSs. The "long-busy" signal indicates to the each OS that it is being held up by proper operation at the device, and that no I/O interrupt is in fact missing. Hence, the OS's then will not be hung up waiting for its I/O request to complete. In S/390, the device will reject the next command with unit check interrupt and sense data to indicate a 'long busy' condition exists at the device. Upon seeing the long busy condition, the OS software has controls that readjust its internal MIH interval so the attempted I/O request remains queued in the OS until a no-longer busy status is seen for the device indicating that another I/O request can now execute. Thus if the I/O request stays queued for longer than the secondary MIH time and the MIH interval expires, the timing control process may start the MIH interval over such as by simulating an interrupt to end the current MIH timeout measurement for the I/O request and signal a retry for the I/O request that will start the timeout measurement from its beginning for the retried I/O request. These retries may be under count control from device error recovery procedures in the system.

Thus, the device is put into the busy state when it starts executing a channel program for an I/O request, and it may be put in the long-busy state for a long command that lasts until the request completes. The busy/long-busy state at a device ends when the associated I/O request successfully completes.

The primary and secondary MIH intervals are used by a requesting OS when its I/O request is executing at the device. The long-busy signal allows an extension (not previously used) of the MIH timeout period (interval).

It is also an object of this invention to operate a system under a single OS which allows overlap of a next request with a current request which has not yet completed, and still prevent false MIH error indications of missing interrupt signals.

A long command, with no following chained command, is hereafter referred to as an "asynchronous immediate command". Its busy state remains for a very long time at the requested device, or at its control unit until the requested device completes the requested operation.

This invention solves a request overlap problem in the device CU by immediately providing a completion interrupt when a long-busy signal is provided by the I/O control unit, even though the command has not in fact completed operation in the associated device (and it may not have even started device operation when its completion interrupt is signalled to the requesting OS); this shifts responsibility for handling the I/O request to its OS, and relieves the I/O subsystem from currently handling that request. This may be done by the I/O control unit (CU) sending an "immediate" interrupt signal to the central processor complex for the OS in response to CU acceptance of an "asynchronous immediate command". "Immediate" means that the "completion interrupt" is sent to the central processor complex at the time the command is accepted at the control unit, although the device need not have then started executing the command; no interrupt signal is provided later when the device actually completes the command. The "long busy" state continues at the CU until all operations for the long command are completed by the required device. The receipt of the immediate interrupt by the OS causes it to immediately take the responsibility for the long command.

The long busy state of the device may at any time be tested by any OS issuing a test instruction to the CU, such as to determine whether the OS wants to delay issuing another request to that device if a long busy state exists for the device. Thus, the inventive combination of a "long busy" signal for a device, and an "immediate" long-busy interrupt signal to the OS prevents false MIH indications from occurring for long busy commands, as happened in prior MIH systems which had an MIH timeout while waiting for the device completion interrupt to be sent from the CU to the OS. Thus, the control unit may be tested by any executing OS to determine the availability of the associated device before issuing another I/O request for operating that device.

BRIEF DESCRIPTION OF THE DRAWINGS

FIGS. 5a, 5b, 5c and 5d are flow charts showing control flow for control units and their devices supporting LONG-BUSY conditions.

FIGS. 6a, b and c are flow diagrams describing how an operating system obtains a device's self description data, which includes its PRIMARY MIH TIMEOUT interval and its SECONDARY MIH TIMEOUT interval.

DESCRIPTION OF THE PREFERRED EMBODIMENT

Figure 1:
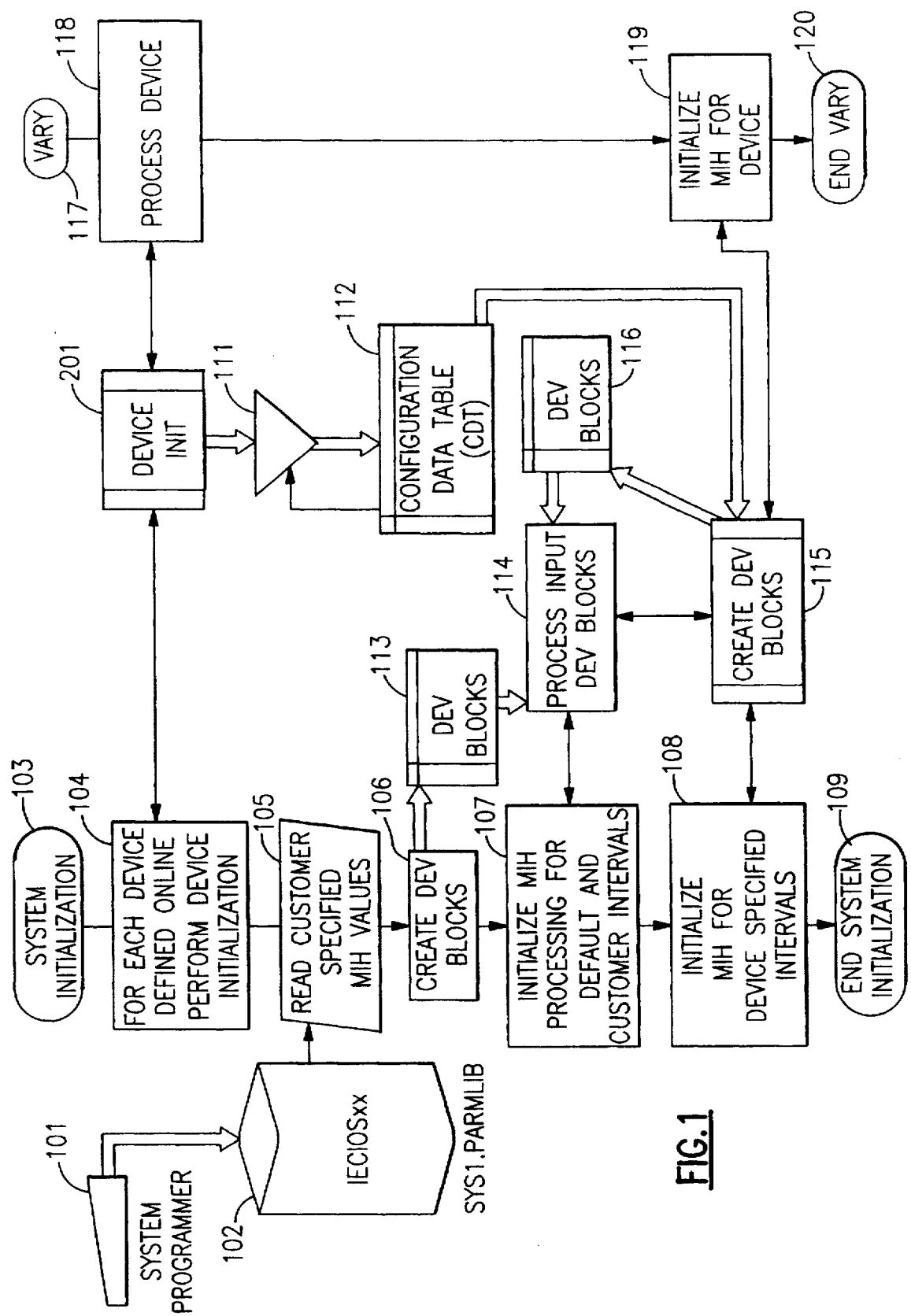
FIG. 1 is a flow chart showing a control flow for system initialization and for a VARY-command device processing, which establishes the initial missing interrupt time intervals for each device.

The environment for this preferred embodiment is described as including IBM's MVS/ESA (Enterprise System Architecture) and the IBM 3590 tape storage device. Those skilled in the art will understand that the methods described herein for this preferred embodiment may be applied to other operating systems and computer architectural platforms without deviating from the scope of the claimed invention.

Device Self Description Extensions

Devices supporting the preferred embodiment will return two new fields contained in the self description data when using the Read-Configuration-Data command, previously described herein, in the following manner:

Missing Interrupt Handler Primary Time Out (MIHPTO): Byte 2 of word 1 (603) contains a value which specifies the control unit's recommended "primary MIH time-out interval" which is used to set the missing-interrupt-handler timeout for the device. This timeout is the longest time a channel program is expected to last, taking into account any device recovery processes, and any queuing time, as a result of a presentation of a busy or a channel command retry status if no value is specified for the missing-interrupt-handler secondary timeout. If a secondary MIH timeout is specified, then this time is the longest time a channel program (which contains no model-dependent long-running commands) is expected to take, taking into account any device recovery processing, and any queuing time, as the result of busy or channel command retry status.

The primary MIH time-out interval value is a base-ten value obtained from the mantissa and exponent specified in the primary MIH time-out interval field. A primary MIH time-out field containing this value has the format shown in FIG. 6b (604).

When the mantissa is greater than zero, bits 0–1 of byte 2 of word 1 (EX) contain an unsigned binary integer that is the exponent for primary MIH time-out values greater than zero. When the mantissa is zero, no value is specified for the primary MIH time-out value, and bits 0–1 of byte 2 of word 1 (EX) have no meaning.

Bits 2–7 of byte 2 of word 1 contain an unsigned binary integer that is the mantissa for the primary MIH time-out value. When this field contains a zero, no value is specified for the primary MIH time-out interval.

The exponent field is decoded as shown in FIG. 6c.

Secondary MIH Time Out (MIHSTO): Byte 3 of word 1 (602) contains a value which specifies the control-unit's recommended value for the program's secondary MIH time-out interval for the device. The MIHSTO value is the larger of:

The maximum expected duration of any long-implicit allegiance formed for device dependent long-running commands, or The maximum expected duration of a device-dependent long-busy condition.

The MIHSTO value is the maximum expected duration of long-busy conditions or the longest expected execution time for channel programs containing a model-dependent long-running command, taking into account any device recovery mechanisms and any queuing time as a result of busy or channel-command-retry status.

The secondary MIH time-out value is a base-ten value based on the mantissa and exponent specified in a secondary MIH time-out field.

The secondary MIH time-out field has the format shown in FIG. 6b.

When the mantissa is greater than zero, bits 0–1 of byte 3 of word 1 (EX) contain an unsigned binary integer that is the exponent for secondary MIH time-out values greater than zero. When the mantissa is zero, no value is specified for the secondary MIH time-out interval, and bits 0–1 of byte 2 of word 1 (EX) have no meaning.

Bits 2–7 of byte 3 of word 1 (Mantissa) contain an unsigned binary integer that is the mantissa for the secondary MIH time-out value. When this field contains a zero, no value is specified for the secondary MIH time-out value.

The exponent field is decoded as shown in FIG. 6c.

Figure 5A:
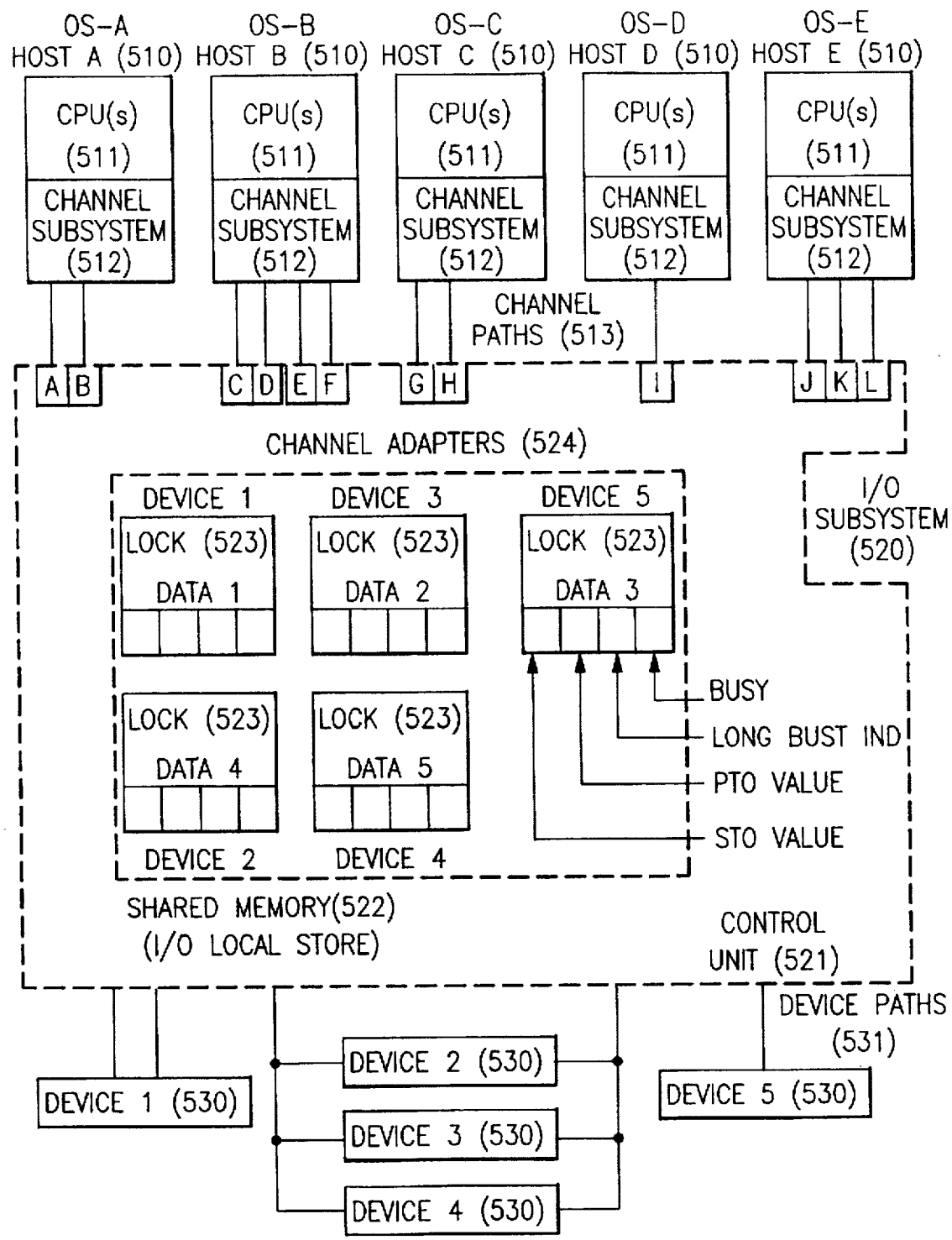
Figure 5B:
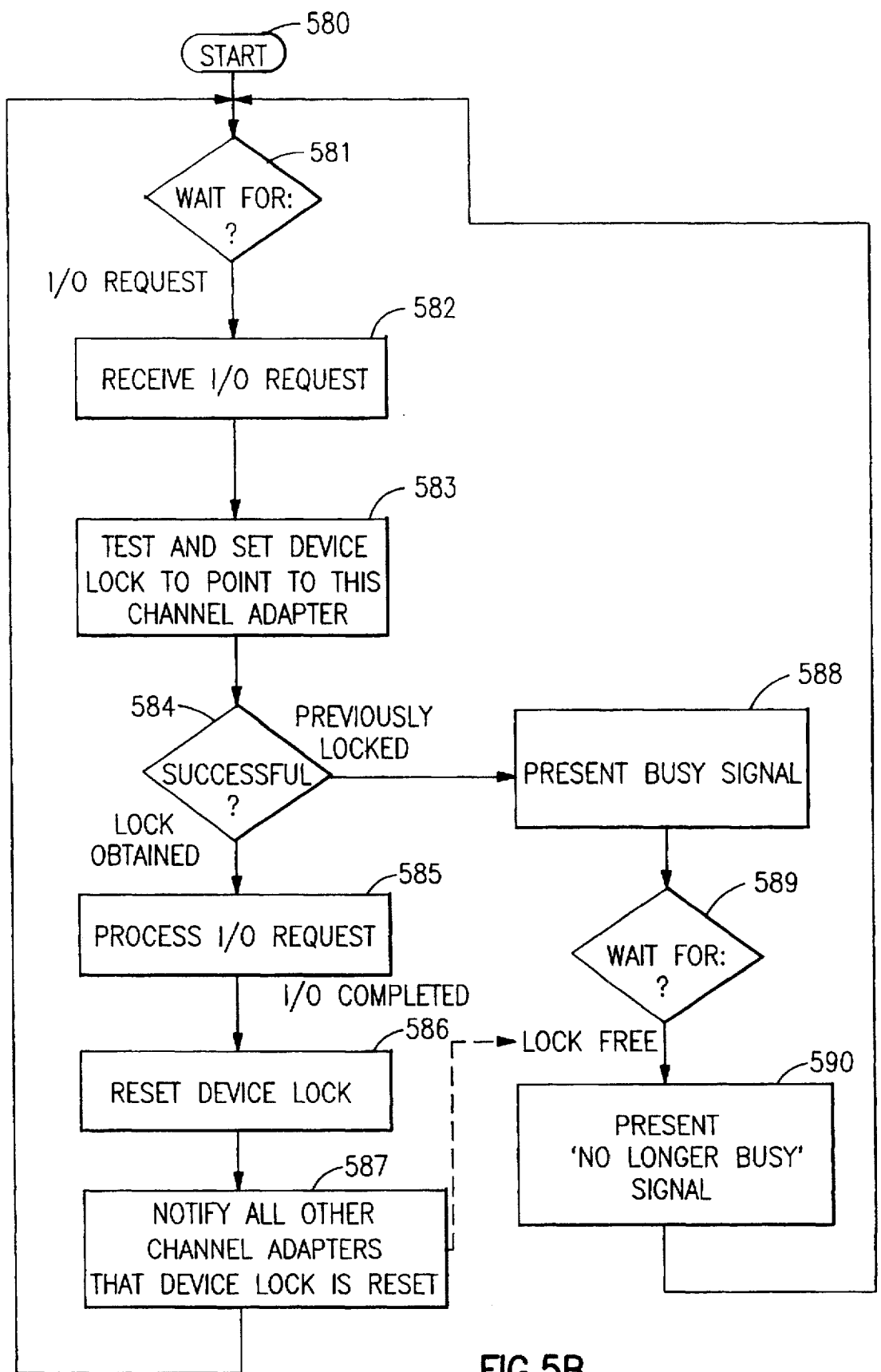

Long Busy Protocol: The process described herein in the section "Bounding of Queuing Durations" as follows:

The method employed here is shown in FIG. 5c and is a modification of the method shown in FIG. 5b. The method uses a CU timer for each channel adapter built into the CU. Each CU timer measures the queuing time of an I/O request received by a respective channel adapter from the time the I/O request is first received by the channel adapter until the requested device begins processing of the request. The CU timer is initially set to zero and, once started, begins to measure elapsed time. A CU timeout is detected by the control unit if the control unit timer's elapsed time exceeds a "threshold" value defined as somewhat less than the MIH time-out value currently being used by OS software monitoring the I/O request. The concept here is that the control unit is timing in order to be able to transition from an active to a long busy (LB) state.

Each channel adapter performs an atomic "test and set" operation on a lock associated with the requested device before the device is allowed to begin the I/O operation for the request. If the test and set operation is successful (i.e. the request obtains the device's lock), the I/O request is accepted and processed by the device; this may involve one or more I/O commands to the device. If the test and set operation is unsuccessful, the I/O request is presented a busy indication and the CU timer is started.

The CU timer is reset when the requesting channel adapter successfully obtains the lock for the requested device, since acceptance of the I/O request is an indication of the end of the request's queuing time. At the completion of the I/O request by the device, the other channel adapters are signaled that the lock has been reset and the device is again available. For other channel adapters which have been presented a busy indication and have not experienced a timeout, the signal causes a "no longer busy" indication to be signaled which in turn causes the channel subsystem to again reissue the I/O request to each of these channel adapters. The CU timer continues to run for each channel adapter, since the reissuance of the I/O request may again fail to get the device lock, resulting in another busy indication and a continuation of the queuing time.

Should a CU adapter timeout occur, the channel adapter is conditioned to signal a unit check indication to the channel when an I/O request is next received. In the case where the timeout occurs between the presentation of a "busy" indication and a "no longer busy" indication, a "no longer busy" indication is signaled to the channel subsystem in order to get it to reissue the I/O request that is queued (waiting) within the I/O subsystem (channel). The "unit check" indication is presented to the software and is accompanied by "sense" data that informs the OS software that the control unit is still functional, but that the device is in the "long busy state" (i.e. it is not responding to this I/O request because it is busy processing operations from other hosts that have exceeded the maximum I/O subsystem queuing time on this I/O request). The normal OS software response to this indication is to wait for a "no longer long busy" indication which is presented by the channel path the next time the device lock is freed.

There are some complexities of implementation that warrant a discussion. Multipathing systems as described in the subsection "System Environment" tend to retry I/O requests over the available set of channel paths when a busy indication is received (at least in certain modes of operation where the set of channel paths associated with a given host are not coordinated as a group). As such, more than one channel adapter may end up signaling a busy indication and be primed to present a no longer busy indication. When the resulting no longer busy indications are presented, the channel subsystem will choose one of the available paths to redrive the I/O request on. There are also cases where the I/O may be terminated in the channel subsystem and not reissued at all.

Software Timeout Values: As previously described, this invention provides that a given I/O request that remains queued due to a received busy indication for the duration of the long busy timeout will be redriven and subsequently be presented a "unit check" indication that is visible to the software. The software in turn can expect that a given I/O request will either complete within the time period given by the execution time of the I/O request plus the long busy timeout or a long busy indication will be received.

Figure 5D:
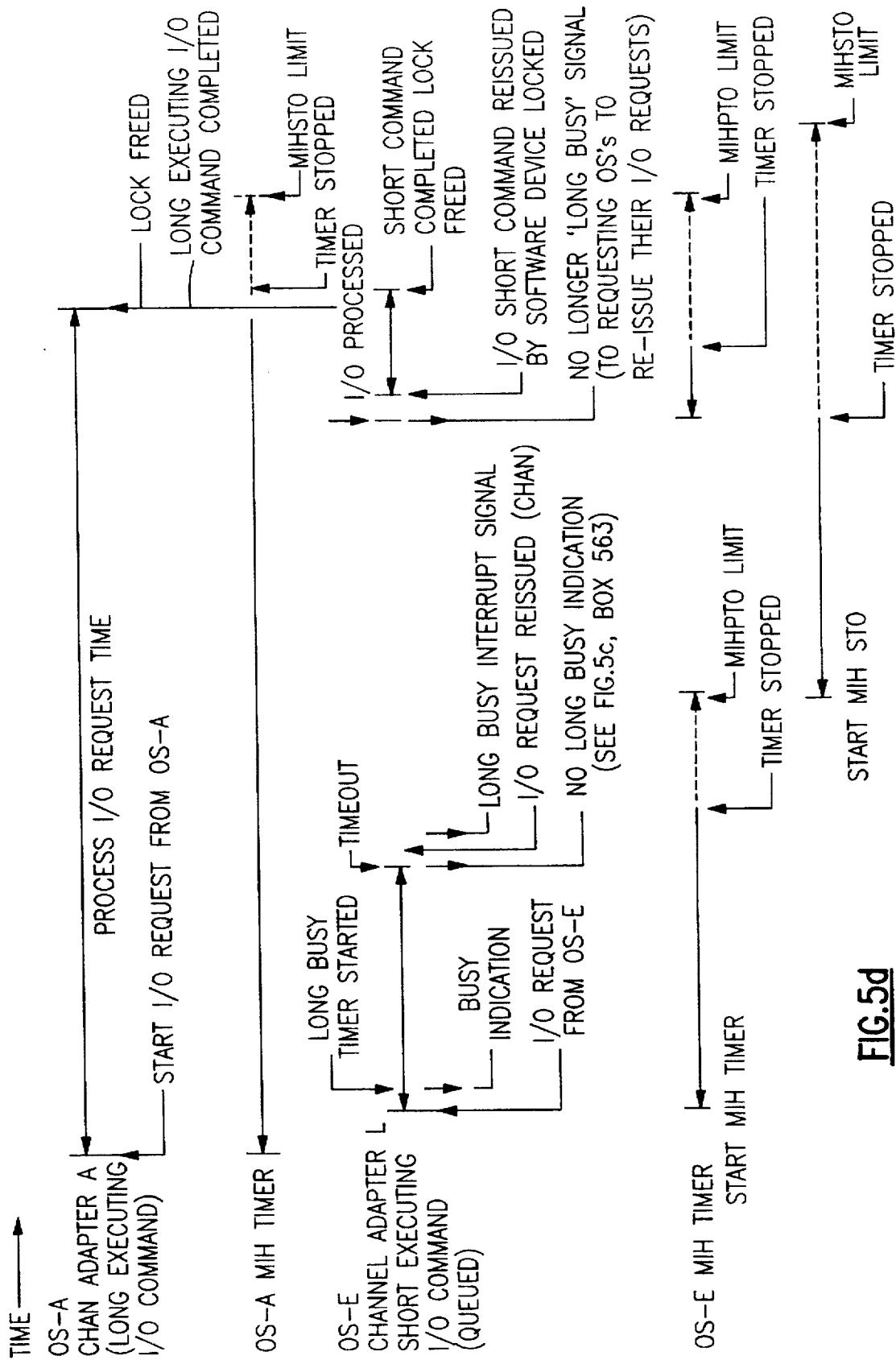

Additionally, since the "no longer long busy" indication is signaled when a device's long busy timeout has not reached its time limit and is thereby freed, the time period between receiving a "long busy" indication and a "no longer long busy" indication is bounded by the worst case execution time of any given I/O request. As determined for a given device, this timeout value can be used to ensure that the "no longer long busy" indications are not lost. The relationship between a channel path that has queued an I/O request and a channel path that is executing a long command is shown in FIG. 5d.

In order to factor in the effect of command execution times on the MIH timeouts, commands comprising the channel program for an I/O request can be divided into two classes, long and short. (Theoretically, the command classification may be done by providing more than two classes of execution times, e.g. short, intermediate and long, etc.; however, two classes are used in the preferred embodiment.) OS software analyzes the commands for a current I/O request to determine whether its channel program contains, or does not contain, a long command, and then uses the short MIH timeout value if no long executing command is found for the I/O request, which is the primary MIH timeout (MIHPTO) value. The long MIH timeout value is used if one or more long commands are found in the channel program for the I/O request, which is the secondary MIH timeout (MIHSTO).

Thus I/O requests may be classified as either short requests (I/O requests having a channel program not containing any long executing commands), and long requests (I/O requests having a channel program containing at least one long executing commands.

The primary MIH timeout (MIHPTO) value may be determined as the execution time expected for a nominal I/O request that DOES NOT contain long commands. The secondary MIH timeout (MIHSTO) value may be determined as the sum of the execution time for the longest command and the worst case execution time for a nominal channel program of an I/O request that DOES contain long commands.

The OS software detects a missing interrupt for a short I/O request if the MIHPTO elapses before receiving an interrupt indicating either: 1) a completion indication for the short I/O request, or 2) a long busy indication for the needed device representing that the device has become busy executing a long command for another request. If a long busy indication is received, the OS software queues the I/O request and awaits the reception of an interrupt from the device signaling a "no longer long busy" indication, after which the OS software can reissue the I/O request to that device.

For a long I/O request, the OS software detects a missing interrupt from the device if the MIHSTO elapses before any interrupt is received indicating the completion of that long I/O request.

After the reception of a long busy indication by the OS software, it detects a missing interrupt if the MIHSTO elapses before receiving any "no longer long busy" indication.

System Device Initialization: Step 104 in FIG. 1 represents a device initialization process, which is shown in detail in FIG. 2, which performs the system initialization process for each device being defined to be online to the operating system. The device initialization process is invoked at step 201 in FIG. 2 and ensures that the device (shown in FIG. 1) is operational (202) by testing each available path to the device with an innocuous I/O command in step 211. In the case of tape drives, a no-operation (NOP) channel command is issued. If no operational path is found in step 203, the device is marked offline (208) and processing continues to the next device (104). If at least one operational path is found for the device (204), a sense-id I/O command is issued (212) in order to retrieve command information words for the device (in the current ESA/390 computer architecture). The command information word identifies the channel command that allows the program to retrieve the device self description data. For each operational path to the device (205) the readconfiguration-data command is issued (213) to retrieve the device configuration data record (CDR) and add it to the OS configuration data table (CDT) in step 215.

FIG. 6a shows the device PRIMARY MIH TIMEOUT value (603) and the device SECONDARY MIH TIMEOUT value (602) contained in the CDR.

Figure 2:
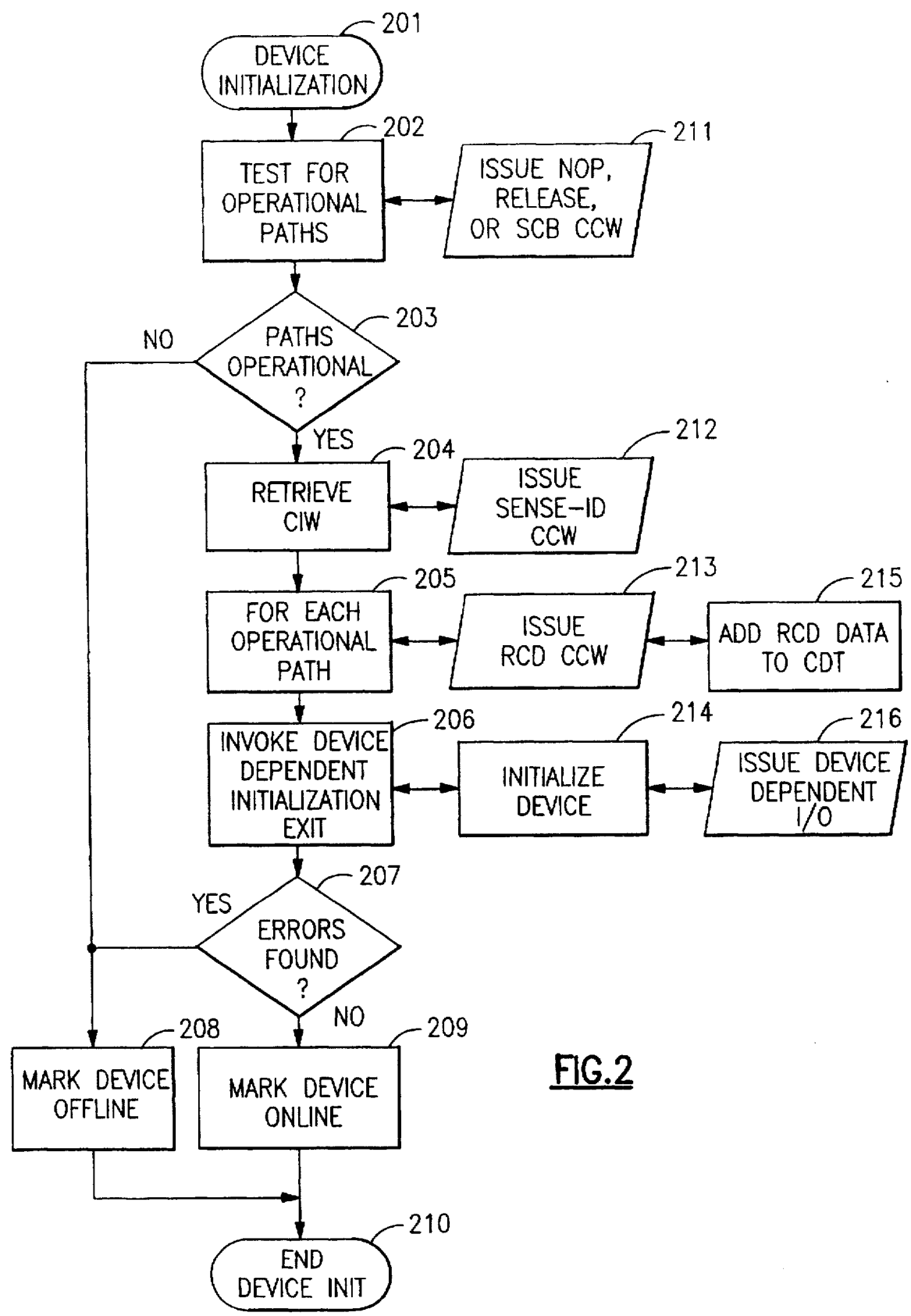
FIG. 2 is a flow chart showing a control flow for device validation and initialization which includes retrieval of the device dependent MIH time intervals.

In FIG. 2, once the device self description data has been placed into the CDT in the OS, device dependent initialization procedures are invoked at step 206 to initialize system control blocks with information on how the device can and will be used. If no errors are found during the device initialization process by test step 207 the device is marked online and available for use by step 209. If errors are found by step 207, the device initialization process then marks the device offline in step 208, and the device cannot be used by applications until the error is fixed.

In FIG. 1, once all the devices have been validated and device initialization process completed at step 104, MIH initialization commences at step 105. MIH initialization first consists of reading customization data specified by the system programmer in a SYS1.PARMLIB dataset, member IECIOSxx (102). This customization data consists of the MIH timeout values that the customer wants imposed on certain I/O devices. This customization data is optional, as there are fixed MIHPTO and MIHSTO timeout default values for all device types supported by the system. The text records from the IECIOSxx member are converted into internal text records called DEV blocks in step 106 which creates one DEV block for each device MIH value written in IECIOSxx and they are chained together and anchored from an MIH processing work area 113. Later on in system initialization, when all the system services are available for use, MIH initialization continues at step 107 by processing each DEV block and creating the internal data structures necessary to enforce the MIH timeouts specified by the customer in step 114.

After all of the customer specified time intervals have been processed for system initialization step 107, those devices that did not have their MIH timeout values modified by the customer have the default PRIMARY MIH timeout values processed in step 108. This processing consists of building DEV blocks to represent the devices in step 115 and inputting them to step 114 that processes the DEV blocks with the customer input.

Figure 3B:
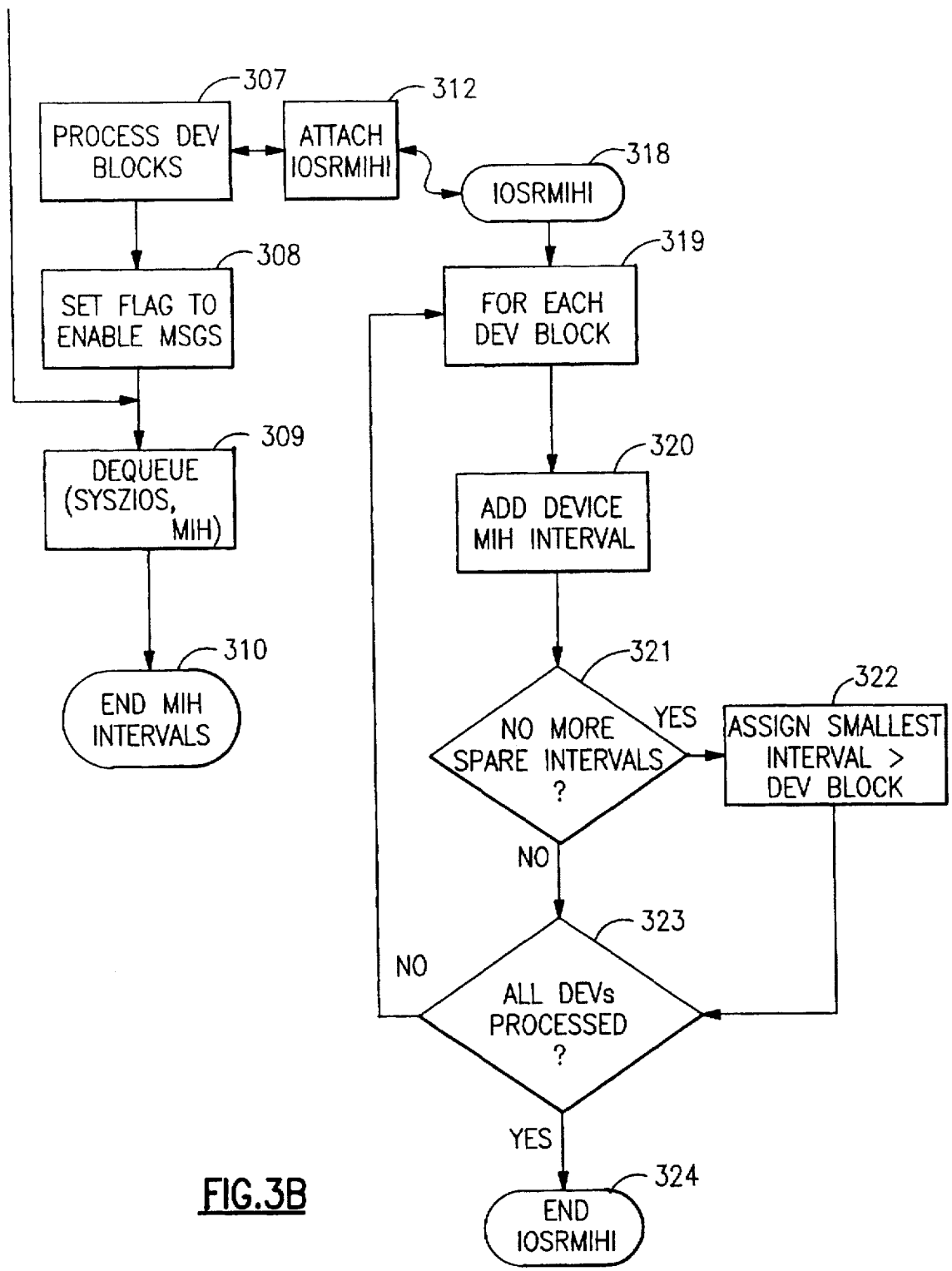
FIG. 3 is a flow chart showing a control flow for the MIH initialization processing.

The details of the process of creating these DEV blocks with the MIH timeout values are shown in FIG. 3. The Device MIH Interval processing is entered at step 301 during system initialization or from a VARY device process to be described later. Step 302 enqueues the device block to serialize its access against other MIH processing that could be the result from other MVS commands, such as SET IOS=xx and SETIOS MIH, . . . that modify the MIH processing for the devices. Once the system enqueue is obtained, each device in the system is examined (303) to determine if the installation already specified an MIH interval in IECIOSxx (102). If the customer did already specify an interval (311) then processing continues to the next device (304). However, if the customer did not specify an MIH interval then the MIH primary timeout value is retrieved (313) for that device from the configuration data table (112). If the MIH primary timeout value is not zero (314) then a DEV block is built to represent the device (315). The DEV block is then anchored onto a global queue of DEV blocks (316) and processing continues to the next device in the system (304). Once all the devices in the system have been processed a check is made to see if any DEV blocks have been created (305). If no DEV blocks have been created then processing terminates by freeing the MIH enqueue (309) by dequeuing it, and returning control to the caller (310).

However, when DEV blocks have been queued in step 302, then they are processed by first setting a flag so that all message processing is skipped (306). Message processing is skipped because these MIH changes are not from an explicit customer command. Next, the MIH Initialization process (IOSRMIHI) is invoked at step 312 to process the queued DEV blocks in the same way that customer specified MIH intervals are processed (318). After the IOSRMIHI completes processing, message processing is enabled again (308), the MIH enqueue is released (309) and control is returned to the caller (310).

With this invention, the MIH timeout values (MIHPTO and MIHSTO) may be uniquely assigned to each device. It is expected that values other than the OS defaults will be commonly used. If more unique MIH timeout values are used for the devices than the OS can support (MVS can support 256 unique MIH timeout values) then special processing is needed to handle the devices. In MVS, if no more unique MIH scan interval is available (step 321), then MVS assigns the smallest available interval greater than the value requested by the device (322). This insures that I/O operations are not prematurely terminated while providing the most responsive time for detecting device failures. If there are no intervals available greater than the primary MIH timeout value contained in the DEV block, then the default MIH time for the device class is used.

Once system initialization completes (109) the system can modify the configuration table by adding new devices or simply issuing the MVS VARY device command to bring offline devices online (117). Whenever offline devices are brought online, they undergo the same device initialization process (201 in FIG. 1, and all of FIG. 2) that was performed during system initialization and described in FIG. 2. After the device initialization process is done, DEV blocks are created and processed in the same way they were processed during system initialization (FIG. 1).

Once the Operating System is initialized and jobs begin to run on the system, I/O requests are issued by the OS to its I/O supervisor for execution at the device, and are timed by the Missing Interrupt Handler subcomponent of the type described in prior U.S. Pat. No. 5,388,254.

Three new fields are added to the operating system's internal representation for each device implementing this invention:

Long busy indicator: A bit indicating that the last I/O request to the device encountered a long busy indication (unit check with sense data). Long busy is a signal from the device issued when the device is executing a command chain that contains a long running command or when the subsystem enters a processing state that will take a long time and that precludes the subsystem from accepting any commands while it is busy.

LBREDRIVE indicator: A bit indicating that while in the long busy state an I/O request was re-issued by the OS to the device after the elapsed time was greater than the MIHSTO value.

Accumulated MIH time: A 32 bit field representing the total time that a device remains in the long busy state (this elapsed time starts when the long busy indicator is set for the device.

Figure 4A:
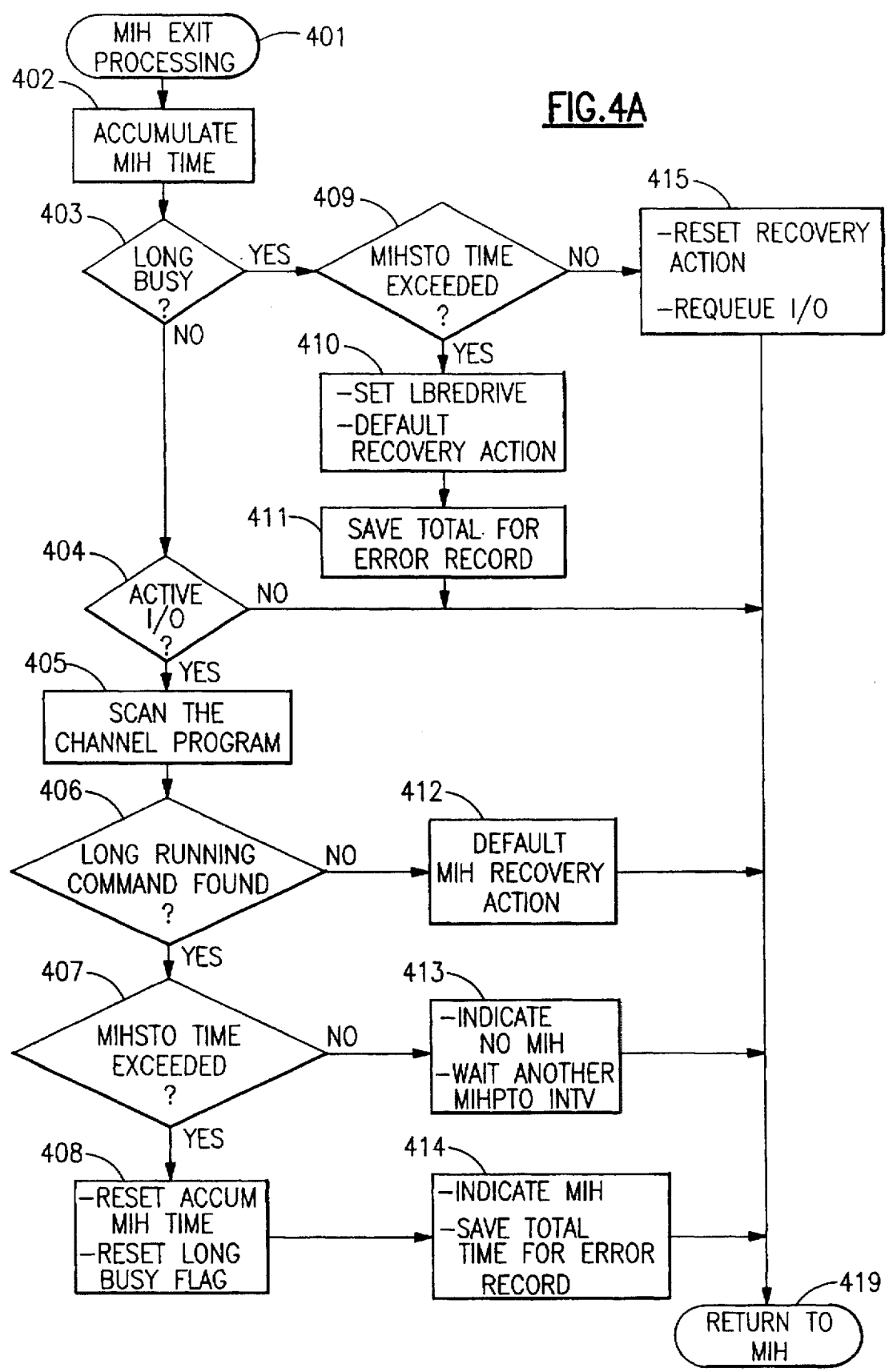
FIGS. 4a, 4b, 4c, 4d and 4e provide flow charts showing control flows in software processing for handling device dependent MIH processing for LONG-BUSY conditions, including detecting MIH timeout conditions.

In the OS when the primary MIH time interval has expired (accumulated time>MIHPTO) for an active or queued I/O request, OS considers the device eligible for MIH recovery and exits to device dependent MIH Exit processing shown in FIG. 4a. The MIH exit is entered at step 401 after the primary time interval has expired. Step 402 accumulates the total elapsed time that the I/O request is pending at the device. Step 403 tests if the device is indicated in the LONG BUSY state (while the I/O request remains queued and not active), then the total accumulating time is compared to the MIHSTO time for the device (409). If the MIHSTO time is exceeded, then step 410 turns on the LBREDRIVE bit to indicate that MIH has been entered to redrive the request, and step 410 goes back to MIH to restart the queued request after step 411 saves the total time accumulated for the request for an error record recorded in the system error log by MIH.

If the total accumulated time has NOT exceeded the MIHSTO timeout interval, step 415 is performed which resets the error recovery action, requeues the I/O request for reissue, and returns to the MIH process.

If step 403 finds the device is not in the long busy state and step 404 finds an active channel program, then step 405 scans the channel program to determine if it contains any long running command. The following are examples of long running commands for controlling an IBM 3590 tape device:
REWIND, FORWARD SPACE FILE, BACKWARD SPACE FILE, LOCATE BLOCK, FORMAT, ERASE, DATA SECURITY ERASE, UNLOAD, LOAD, MOVE If a long running command is not found in the I/O request's program, step 412 requests normal MIH recovery. However, if a long running command was found by step 406, the total accumulated time is compared to the MIHSTO value. Step 407 determines if the accumulated time exceeds the MIHSTO value. If the value is not exceeded, step 413 indicates that the MIH processor wait another MIH interval (MIHPTO), before returning to the MIH Device Dependent Exit. If while the MIH processor is waiting for another MIH interval to elapse the channel program completes the MIH Device Dependent Exit will not be reentered for this I/O. But if step 407 finds the total accumulated time does exceed the MIHSTO, step 414 then resets to zero the total accumulated time, resets the long busy flag, and saves the total accumulated time in an error recovery record. The MIH process is reentered.

Figure 4B:
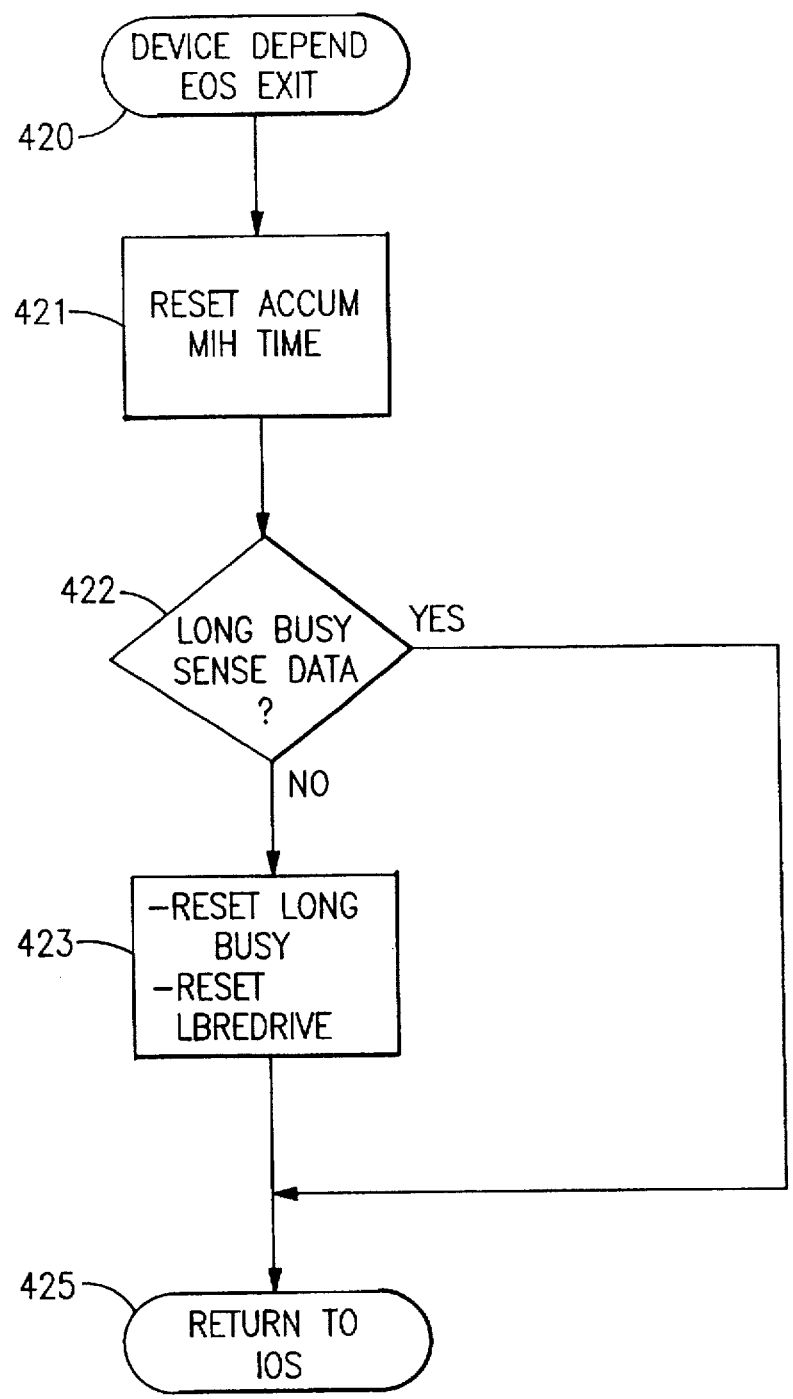
Figure 4C:
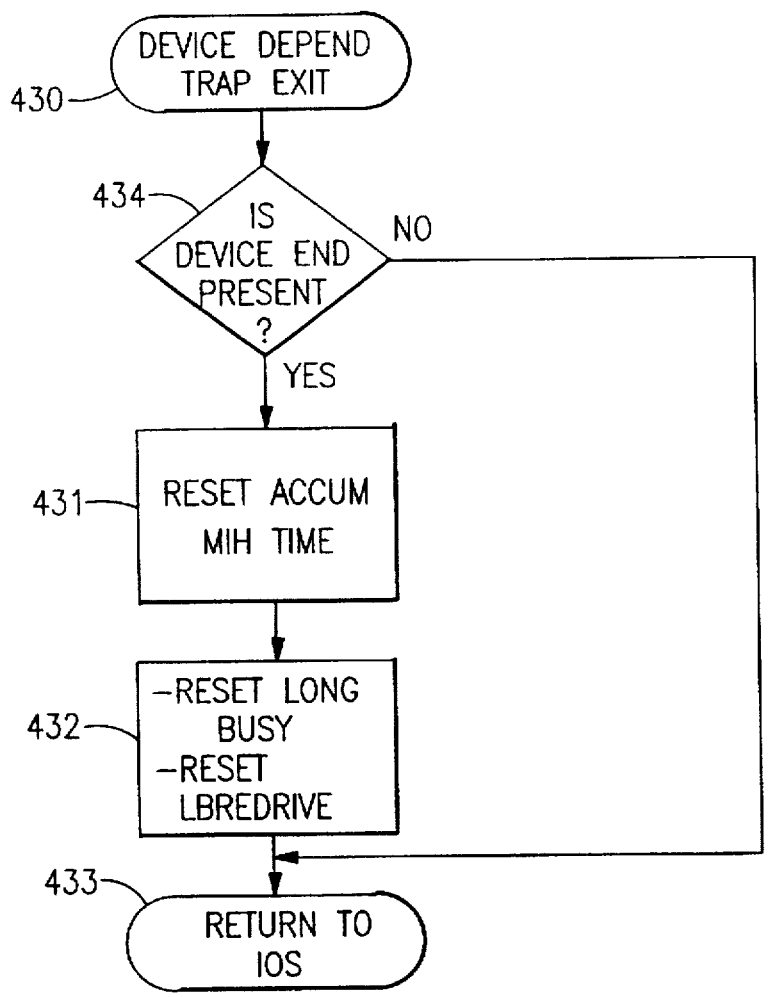

Any time an active I/O request completes, the process shown in FIG. 4b or FIG. 4c is used to reset the accumulated time to zero and to reset any long busy indication for the device, and resets the LBREDRIVE flag. FIG. 4b represents a device dependent End-of-Sense (EOS) Exit which processes a device end signal when unit check is also present for a device completing the I/O request. In this process, step 421 is invoked after the sense data has been read to reset to zero the total accumulated time for the request. Step 422 tests for existence of a "long busy" indication associated with the sense signal. If step 422 does not find long busy sense data, then step 423 resets the long busy indication for the device, and resets the LBREDRIVE flag. If step 422 finds long busy sense data or after step 423, a return is made to the IOS (I/O System) software in the OS which contains the MIH routine that controls the MIH operations for the OS.

A device dependent trap exit routine (430) in the MIH process is represented in FIG. 4c, and this trap control process gets control whenever a device completes and provides a device end signal without unit check. Then, step 431 resets to zero the total accumulated time for the request, and step 423 resets any long busy indication for the device, and resets the LBREDRIVE flag, and a return is made to IOS.

Figure 4D:
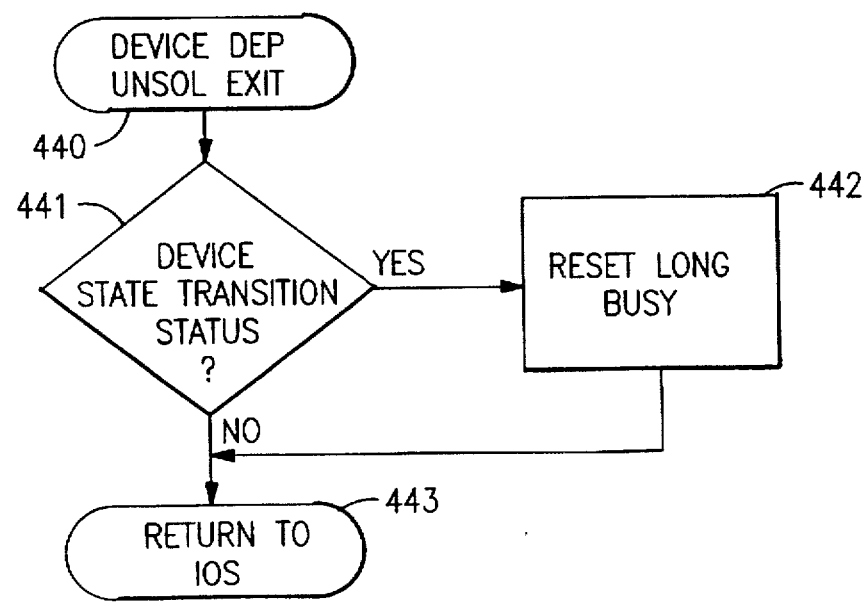

Any time an unsolicited interrupt occurs for a device, the device dependent Unsolicited Interrupt Exit (Device Dep Unsol Exit) code is entered at step 440 shown in FIG. 4d. If the next step 441 finds the status for the interrupt indicates a device state change has occurred, step 442 resets the long busy indicator.

Figure 4E:
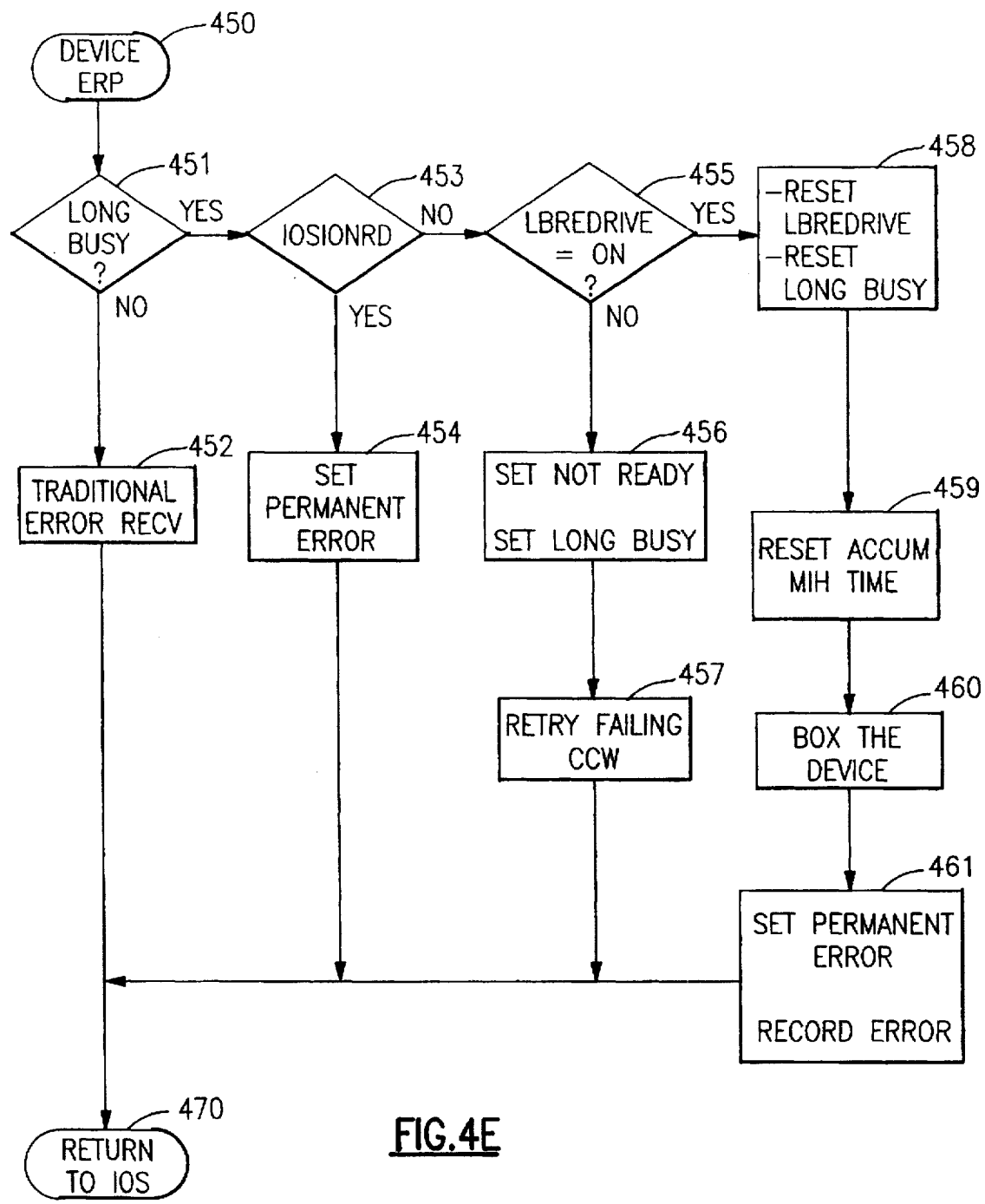

When an I/O request encounters an error, a device dependent Error Recovery Procedure (Device ERP) is invoked, which is shown in FIG. 4e. Step 451 determines if the I/O error was caused by a long busy condition, and if not, step 452 performs traditional error recovery processes in step 452, which may include retrying the I/O operation, and returns to IOS. If, however, step 451 finds the error was due to a long busy condition, then the I/O request is checked to see if it needs to execute even if the device is not ready by performing step 453. If the I/O does need to execute to satisfy the ERP, then step 454 marks the I/O request in permanent error and the job is posted in step 470. If the I/O does not require execution when the device is not ready, the LBREDRIVE bit is checked in step 455 to see if the request was redriven from MIH. If the request was redriven from MIH and is still in the long busy state—then the device is considered to be in permanent error. In steps 458 and 459 the long busy indicator and LBREDRIVE flags, and total accumulated times are reset. The device is then forced offline and marked such that all new I/O requests are rejected with a permanent I/O error by step 460. Finally, the current I/O request is marked with a permanent error by step 461, and the job posted in step 470. If the LBREDRIVE flag was not on, then step 456 marks the device as being in the long busy state so that a retry of the failing channel program by step 457 will stayed queued inside of IOS, waiting for the long busy to subside (FIG. 4d), and monitored by MIH to cap the total long busy time (FIG. 4a), described above.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

Having thus described our invention, what we claim as new and desire to secure by letters patent is:

1. Support controls within an I/O control unit (CU) for operating with a plurality of host system adapter interfaces located in the CU for connecting the CU to host systems that send I/O requests to the CU and use timeout detection for determining when a requested I/O device attached to the CU has failed to perform a requested I/O operation, the CU comprising:

- a plurality of device lock bits respectively associated with I/O devices connected to the CU to control a connection of any of the I/O devices to any of the adapter interfaces for an I/O operation,

- a busy bit, a threshold timer associated with each of the adapter interfaces, and a stored threshold timeout value for operating with the timer for determining occurrence of a threshold timeout,

- bit testing controls for each of the adapter interfaces for attempting to set to a lock state an available one of the lock bits associated with an I/O device required by a current I/O request received by the adapter interface which may contend for the lock state with a current I/O request received by any other of the adapter interfaces simultaneously attempting to obtain use of the associated I/O device,

- busy bit controls associated with the adapter interface for setting the associated busy bit to a busy state when a waiting I/O request is received by the adapter interface while the associated lock bit is set to the locked state for a current I/O request using the associated I/O device,

- timer starting controls for resetting and starting the timer associated with the adapter interface when the associated lock bit is set to a lock state,

- long busy controls in the CU associated with each adapter interface for generating a long busy signal to the adapter interface if the associated timer exceeds the threshold timeout while a locked state exists for the lock bit, and the long busy controls transferring the long busy signal from the adapter interface for transmission external to the CU, and

- operation completion controls associated with each lock bit for generating a no-longer long-busy signal when the device lock is set to an unlocked state after the threshold timeout is exceeded, and the operation completion controls transferring the no-longer long busy signal to the adapter interface for transmission external to the CU.

2. An I/O control unit (CU) having multiple adapter interfaces as defined in claim 1, further comprising:

- regular busy controls in the CU associated with each adapter interface for generating a regular busy signal to the adapter interface when the associated timer does not exceed the threshold timeout while the locked state exists for the lock bit when another I/O request is received by the adapter interface for the associated I/O device, and operation completion controls associated with each lock bit for generating a no-longer regular-busy signal when the device lock is reset to an unlocked state before the threshold timeout is exceeded upon completion of the current I/O request, and the operation completion controls transferring a no-longer busy signal from the adapter interface for transmission external to the CU to indicate that the I/O device is available for another I/O request.

3. An I/O control unit (CU) having multiple adapter interfaces as defined in claim 2, further comprising:

the I/O device successfully completing operation for the current I/O request after the threshold timeout and then signalling the CU to reset the associated lock bit to an available state, and the CU generating a device end interrupt signal and status information for enabling the adapter interface to communicate the availability of the I/O device to external software advising that any next I/O request may be presented to the CU for contending for the lock state of the lock bit associated with the I/O device.

4. An I/O control unit (CU) having multiple adapter interfaces as defined in claim 2, further comprising:

the I/O device unsuccessfully completing operation for the current I/O request after the threshold timeout and then failing to signal any completion interrupt to software of a host system making the current I/O request wherein a missing interrupt handler timer controlled by the software exceeds the extended timeout to indicate a failure of operation by the I/O device for the current I/O request.

5. An I/O control unit (CU) having multiple adapter interfaces as defined in claim 1, further comprising:

controls of the adapter interface generating a signal and status information representing the long-busy signal to the adapter interface when the threshold timeout is exceeded, the long-busy signal enabling the adapter interface to communicate non-availability of the I/O device to external software in order to advise the external software to extend a missing-interrupt-handler timeout for preventing a false timeout detection which would indicate operation failure by the associated I/O device in handling the current I/O request when the I/O device has not failed, and the lock bit remaining in locked state and the I/O device continuing operation for the current I/O request after the threshold timeout has been exceeded.

6. An I/O control unit (CU) having multiple adapter interfaces as defined in claim 1, further comprising:

controls of the adapter interface generating an interrupt signal and status information representing the long-busy signal to the adapter interface when the threshold timeout is exceeded for enabling the adapter interface to communicate a long-busy interrupt signal to host system software sending the waiting I/O request to the adapter interface in order to advise the host system software that the CU no longer takes responsibility for handling the waiting I/O request and to enable the host system software to stop any missing interrupt handler timeout operation for the waiting I/O request which can again be requested by the host system software to the CU for a future operation by the required I/O device, and the lock bit and associated I/O device continuing operations for the current I/O request at the adapter interface.

7. An I/O control unit (CU) having multiple adapter interfaces as defined in claim 6, further comprising:

the associated timer terminating an operation after the interrupt signal and status information have been communicated from controls of the adapter interface.

8. An I/O control unit (CU) having multiple adapter interfaces as defined in claim 1, further comprising:

the controls of each adapter interface continuing a timing operation in the CU by the associated timer after the threshold timeout is exceeded by replacing the threshold timeout value with a second threshold timeout value, the second threshold timeout to support communication to external software of a further extension to the long-busy timeout for use by a missing interrupt handler timeout in the external software for avoiding a false detection of I/O device failure for the current I/O request by increasing granularity of the timeout extensions, and the controls of each adapter interface generating an interrupt signal and status information to communicate to the external software the need for extending the long-busy signal when the second threshold timeout is exceeded while the associated lock bit continues its locked state and the associated I/O device continues its operation for the current I/O request.

9. A method within an I/O control unit (CU) for supporting I/O device failure detection by any of a plurality of host systems which may be connected to I/O interface adapters in the CU that receives I/O requests from the host systems, the CU method communicating information from the CU to the host systems to support missing interrupt timeout detection in the host systems in a manner that prevents any host system from falsely indicating operational failure by a requested I/O device attached to the CU, the CU performing the steps of:

associating a plurality of lock bits with respective I/O devices connected to the CU to control a connection of any of the I/O devices to any of the adapter interfaces for an I/O operation, structuring with each interface adapter a busy bit, a threshold timer, and a stored threshold timeout value for operating the timer to determine an occurrence of a threshold timeout, conditionally testing by any interface adapter the state of the lock bit associated with an I/O device required by a current I/O request received by the interface adapter while simultaneous I/O requests are being made for plural interface adapters trying to obtain use of the same I/O device, setting the associated busy bit to a busy state when a waiting I/O request is received by the interface adapter while the lock bit is set to the locked state for a current I/O request using the associated I/O device, resetting and starting the timer for the interface adapter when a tested lock bit is set to a lock state, generating a long busy signal for the interface adapter if the timer exceeds the threshold timeout while a locked state exists for the lock bit, and transferring the long busy signal from the interface adapter to a host system requesting the I/O device to communicate that the I/O device remains busy with a current I/O request obtaining the lock state, and outputting a no-longer long-busy signal from the interface adapter to indicate the I/O device has completed a requested I/O operation when the device lock is set to an unlocked state after the threshold timeout is exceeded.

10. A method within an I/O control unit (CU) having multiple interface adapters for supporting I/O device failure detection by any of a plurality of host systems as defined in claim 9, the method further comprising the steps of:

providing a regular busy signal to the interface adapter when the associated timer does not exceed the threshold timeout while the locked state exists for the lock bit when another I/O request is received by the interface adapter for use of the associated I/O device, and generating a no-longer regular-busy signal on completion of the current I/O request before the threshold timeout is exceeded, and then resetting the lock bit to an unlocked state, and transmitting the no-longer busy signal from the interface adapter to an external system to indicate that the I/O device is available for another I/O request.

11. A method within an I/O control unit (CU) having multiple interface adapters for supporting I/O device failure detection by any of a plurality of host systems as defined in claim 10, the method further comprising the steps of:

successfully completing operation by the associated I/O device for the current I/O request after the threshold timeout, then signalling the CU to reset the lock bit associated with the I/O device to an available state, and providing a device-end interrupt signal and status information for enabling the interface adapter to communicate the availability of the I/O device to a host system to advise that any next I/O request for the I/O device may be again presented to the CU to contend for obtaining the lock state of the lock bit associated with the I/O device.

12. A method within an I/O control unit (CU) having multiple interface adapters for supporting I/O device failure detection by any of a plurality of host systems as defined in claim 10, the method further comprising the steps of:

unsuccessfully completing operation by the I/O device for the current I/O request after the threshold timeout, wherein the host system continues a secondary timeout operation until the secondary timeout operation exceeds a secondary timeout value to indicate in a missing interrupt handler a failure of operation by the I/O device for the current I/O request.

13. A method within an I/O control unit (CU) having multiple interface adapters for supporting I/O device failure detection by any of a plurality of host systems as defined in claim 9, the method further comprising the steps of:

generating by the interface adapter a long-busy signal and status information representing the long-busy signal when the threshold timeout is exceeded while the lock state exists, the long-busy signal enabling the interface adapter to communicate non-availability of the I/O device to a host system in order to advise the host system to extend a timeout for a missing-interrupt-handler in order to prevent a false timeout detection by the host system which would falsely indicate an operational failure by the associated I/O device in handling the current I/O request when the I/O device operation has not failed, and continuing the locked state and the I/O device operation for the current I/O request after the threshold timeout has been exceeded.

14. A method within an I/O control unit (CU) having multiple interface adapters for supporting I/O device failure detection by any of a plurality of host systems as defined in claim 9, the method further comprising the steps of:

generating a long-busy interrupt signal and status information for the interface adapter when the threshold timeout is exceeded for enabling the interface adapter to communicate the long-busy interrupt signal to the host system sending the waiting I/O request to the interface adapter in order to advise the host system that the CU no longer will handle the waiting I/O request and that the host system should stop any missing interrupt handler timeout operation for the waiting I/O request and to again presented the request to the CU in the future when the required I/O device becomes available, and continuing the locked state for the lock bit and operations for the associated I/O device for the current I/O request associated with the interface adapter.

15. A method within an I/O control unit (CU) having multiple interface adapters for supporting I/O device failure detection by any of a plurality of host systems as defined in claim 14, the method further comprising the steps of:

terminating operation by the timer associated with the interface adapter after the interrupt signal and status information have been communicated by controls of the interface adapter to the host system making the I/O request.

16. A method within an I/O control unit (CU) having multiple interface adapters for supporting I/O device failure detection by any of a plurality of host systems as defined in claim 9, the method further comprising the steps of:

continuing a timing operation for the interface adapter by the timer associated with the interface adapter after the threshold timeout is exceeded by replacing the threshold timeout value with a second threshold timeout value, the second threshold timeout supporting a communication to the host system by the interface adapter of a further extension to the long-busy timeout for use by a missing interrupt handler timeout in the host system for avoiding a false detection of I/O device failure for the current I/O request by increasing granularity of the timeout, and generating an interrupt signal and status information to communicate from the interface adapter to a host system the need for an extended-long-busy signal when the second threshold timeout is exceeded while the lock bit associated with the I/O device continues in the locked state and the I/O device continues to operate for the current I/O request.

17. Support controls within an I/O control unit (CU) for operating with one or more host operating systems (OSs) that send I/O requests to the CU for an operation by a requested I/O device attached to the CU, the CU comprising:

an operation code signal for indicating an I/O command being currently performed by the I/O device for an I/O program associated with an I/O request from an OS, a command detector for testing the operation code signal to determine whether the command is a long command, an interrupt signal generator for generating a long-busy interrupt signal if the command detector determines the command is a long command, sending the long-busy interrupt signal to a processor for communicating the long busy interrupt signal to the OS which issued the I/O request to enable the OS to extend a primary missing interrupt handler (MIH) timeout period to a secondary MIH timeout period before the end of the primary MIH timeout period for preventing the primary MIH timeout period from ending with a timeout which would falsely indicate a potential I/O device operation failure.

* * * * *